United States Patent
Starke et al.

(10) Patent No.: US 11,830,121 B1
(45) Date of Patent: Nov. 28, 2023

(54) NEURAL ANIMATION LAYERING FOR SYNTHESIZING MARTIAL ARTS MOVEMENTS

(71) Applicant: Electronic Arts Inc., Redwood City, CA (US)

(72) Inventors: Wolfram Sebastian Starke, Edinburgh (GB); Yiwei Zhao, Sunnyvale, CA (US); Mohsen Sardari, Redwood City, CA (US); Harold Henry Chaput, Castro Valley, CA (US); Navid Aghdaie, San Jose, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 235 days.

(21) Appl. No.: 17/305,214

(22) Filed: Jul. 1, 2021

Related U.S. Application Data

(60) Provisional application No. 63/141,782, filed on Jan. 26, 2021.

(51) Int. Cl.
*G06T 13/40* (2011.01)
*G06T 15/50* (2011.01)
(Continued)

(52) U.S. Cl.
CPC ............ *G06T 13/40* (2013.01); *A63F 13/573* (2014.09); *G06N 3/02* (2013.01); *G06T 7/75* (2017.01);
(Continued)

(58) Field of Classification Search
CPC . G06T 13/40; G06T 7/00; G06T 7/215; A63F 13/45; A63F 2300/6607;
(Continued)

(56) References Cited

U.S. PATENT DOCUMENTS 5,274,801 A   12/1993   Gordon
5,548,798 A    8/1996   King
(Continued)

FOREIGN PATENT DOCUMENTS

CN   102509272 A   6/2012
CN   103546736 A   1/2014
(Continued)

OTHER PUBLICATIONS

Zhang H, Starke S, Komura T, Saito J. Mode-adaptive neural networks for quadruped motion control. ACM Transactions on Graphics (TOG). Jul. 30, 2018;37(4):1-1. (Year: 2018).*
(Continued)

*Primary Examiner* — Xiao M Wu
*Assistant Examiner* — Scott E Sonners
(74) *Attorney, Agent, or Firm* — Knobbe, Martens, Olson & Bear, LLP

(57) ABSTRACT

In some embodiments, the dynamic animation generation system can provide a deep learning framework to produce a large variety of martial arts movements in a controllable manner from unstructured motion capture data. The system can imitate animation layering using neural networks with the aim to overcome challenges when mixing, blending and editing movements from unaligned motion sources. The system can synthesize movements from given reference motions and simple user controls, and generate unseen sequences of locomotion, but also reconstruct signature motions of different fighters. For achieving this task, the dynamic animation generation system can adopt a modular framework that is composed of the motion generator, that maps the trajectories of a number of key joints and root trajectory to the full body motion, and a set of different control modules that map the user inputs to such trajectories.

19 Claims, 15 Drawing Sheets

(51) Int. Cl.
*G06T 7/73* (2017.01)
*G06N 3/02* (2006.01)
*A63F 13/573* (2014.01)

(52) U.S. Cl.
CPC .... *G06T 15/503* (2013.01); *A63F 2250/1094* (2013.01); *A63F 2300/646* (2013.01); *A63F 2300/6607* (2013.01)

(58) Field of Classification Search
CPC .. A63F 2300/8082; G06N 3/02; G06N 3/047; G06N 3/08; G06V 40/23; G06V 40/28
See application file for complete search history.

(56) References Cited

U.S. PATENT DOCUMENTS

| | | |
|---|---|---|
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,947,123 B1 | 4/2018 | Green |
| 9,984,658 B2 | 5/2018 | Bonnier et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0217723 A1 | 7/2016 | Kim et al. |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0132827 A1 | 5/2017 | Tena et al. |
| 2017/0301310 A1 | 10/2017 | Bonnier et al. |
| 2017/0301316 A1 | 10/2017 | Farell |
| 2018/0043257 A1 | 2/2018 | Stevens |
| 2018/0122125 A1 | 5/2018 | Brewster |
| 2018/0165864 A1 | 6/2018 | Jin et al. |
| 2018/0211102 A1 | 7/2018 | Alsmadi |
| 2018/0239526 A1 | 8/2018 | Varanasi et al. |
| 2019/0139264 A1 | 5/2019 | Andreev |
| 2019/0392587 A1 | 12/2019 | Nowozin et al. |
| 2020/0294299 A1 | 9/2020 | Rigiroli et al. |
| 2020/0394806 A1 | 12/2020 | Payne et al. |
| 2021/0019916 A1 | 1/2021 | Andreev |

(56) References Cited

U.S. PATENT DOCUMENTS

2021/0217184 A1    7/2021  Payne et al.
2021/0375021 A1*  12/2021  Starke .................... G06N 3/047

FOREIGN PATENT DOCUMENTS

| CN | 105405380  A | 3/2016 |
| CN | 105825778  A | 8/2016 |
| JP | 2018-520820 A | 8/2018 |
| JP | 2019-162400 A | 9/2019 |

OTHER PUBLICATIONS

Simon Clavet. Motion matching and the road to next-gen animation. In Proc. of GDC. 2016 (Year: 2016).*
Starke S, Zhao Y, Komura T, Zaman K. Local motion phases for learning multi-contact character movements. ACM Transactions on Graphics (TOG). Jul. 8, 2020;39(4):54-1 (Year: 2020).*
Holden D, Komura T, Saito J. Phase-functioned neural networks for character control. ACM Transactions on Graphics (TOG). Jul. 20, 2017;36(4):1-3. (Year: 2017).*
Anagnostopoulos et al., "Intelligent modification for the daltonization process", International Conference on Computer Vision Published in 2007 by Applied Computer Science Group of digitized paintings.
Andersson, S., Goransson, J.: Virtual Texturing with WebGL. Master's thesis, Chalmers University of Technology, Gothenburg, Sweden (2012).
Avenali, Adam, "Color Vision Deficiency and Video Games", The Savannah College of Art and Design, Mar. 2013.
Badlani et al., "A Novel Technique for Modification of Images for Deuteranopic Viewers", May 2016.
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.
Blanz et al., "Reanimating Faces in Images and Video" Sep. 2003, vol. 22, No. 3, pp. 641-650, 10 pages.
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Dudash, Bryan. "Skinned instancing." NVidia white paper(2007).
Fikkan, Eirik. Incremental loading of terrain textures. MS thesis. Institutt for datateknikk og informasjonsvitenskap, 2013.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Habibie et al., "A Recurrent Variational Autoencoder for Human Motion Synthesis", 2017, in 12 pages.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez, Benjamin, et al. "Simulating and visualizing real-time crowds on GPU clusters." Computación y Sistemas 18.4 (2014): 651-664.
Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.
Hu Gousheng, Face Analysis using 3D Morphable Models, Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.

(56) References Cited

OTHER PUBLICATIONS

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.

Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGRAPH Symposium on Computer Animation (2012), 9 pgs.

Thalmann, Daniel, and Soraia Raupp Musse. "Crowd rendering." Crowd Simulation. Springer London, 2013. 195-227.

Thalmann, Daniel, and Soraia Raupp Musse. "Modeling of Populations." Crowd Simulation. Springer London, 2013. 31-80.

Treuille, A. et al., "Near-optimal Character Animation with Continuous Control", University of Washington, 2007, 7 pgs.

Ulicny, Branislav, and Daniel Thalmann. "Crowd simulation for interactive virtual environments and VR training systems." Computer Animation and Simulation 2001 (2001 ): 163-170.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Vigueras, Guillermo, et al. "A distributed visualization system for crowd simulations." Integrated Computer-Aided Engineering 18.4 (2011 ): 349-363.

Wu et al., "Goal-Directed Stepping with Momentum Control," Eurographics/ ACM SIGGRAPH Symposium on Computer Animation, 2010, 6 pages.

\* cited by examiner

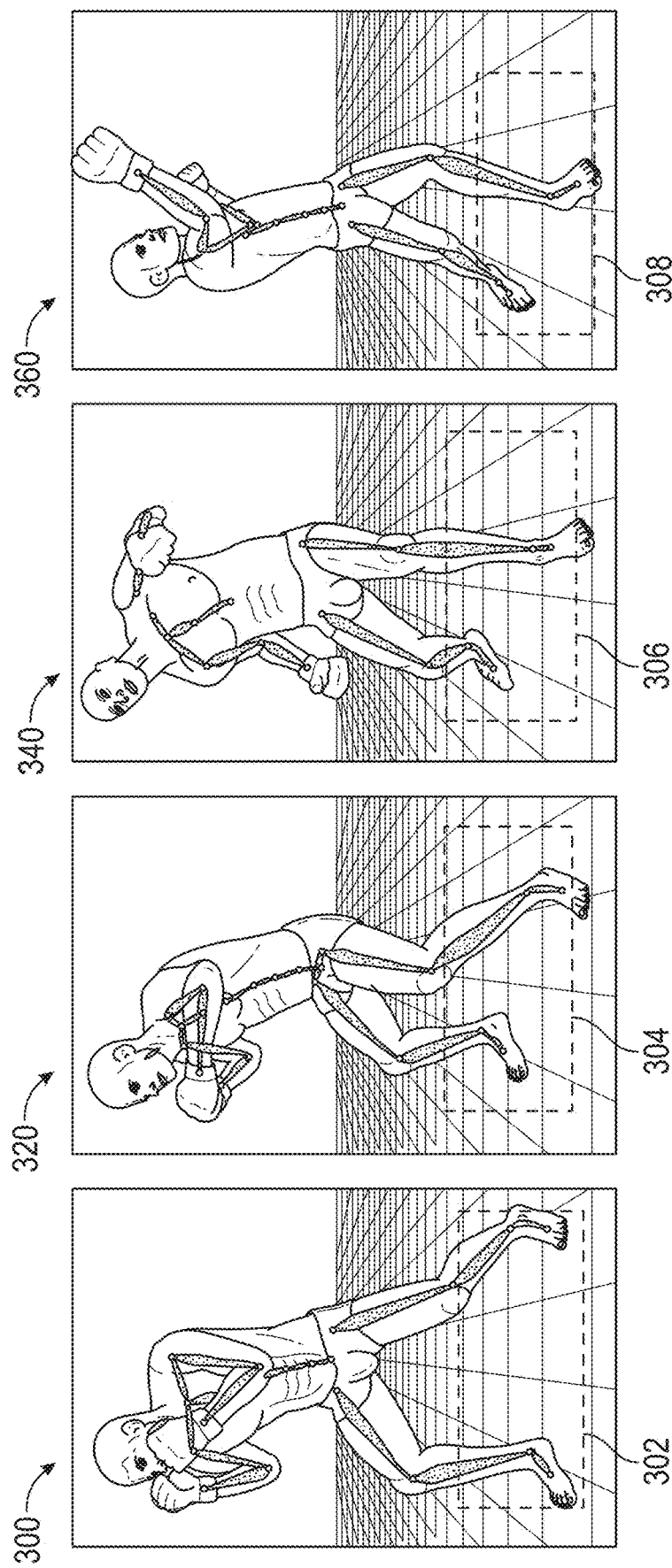

NEURAL ANIMATION LAYERING FOR SYNTHESIZING MARTIAL ARTS MOVEMENTS

CROSS-REFERENCE TO RELATED APPLICATIONS

This application claims the benefit of U.S. Provisional Application No. 63/141,782, filed on Jan. 26, 2021, the disclosures of which are hereby incorporated by reference in their entirety.

TECHNICAL FIELD

The present disclosure relates to systems and techniques for animation generation. More specifically, this disclosure relates to machine learning techniques for dynamically generating animation of characters from motion capture video.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game developers. As an example, electronic game developers may be required to create very rich, and detailed, models of characters. As another example, electronic game designers may be required to create fluid, lifelike, movements of the characters.

With respect to the example of movement, characters may be designed to realistically adjust their arms, legs, and so on, while traversing an in-game world. In this way, the characters may walk, run, jump, and so on, in a lifelike manner. With respect to a sports electronic game, substantial time may be spent ensuring that the characters appear to mimic real-world sports players. For example, electronic game designers may spend substantial time fine-tuning movements of an underlying character model. Movement of a character model may be, at least in part, implemented based on movement of an underlying skeleton. For example, a skeleton may include a multitude of objects (e.g., bones or joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running via adjustment of specific objects which form a character model's legs. This hand-tuned technique to enable movement of a character results in substantial complexity and usage of time.

SUMMARY

The systems, methods, and devices of this disclosure each have several innovative aspects, no single one of which is solely responsible for the all of the desirable attributes disclosed herein.

Particular embodiments of the subject matter described in this specification can be implemented so as to realize one or more of the following advantages. Utilizing the techniques described herein, realistic motion may be rapidly generated for character models. For example, the realistic motion can be configured for use in electronic games. As will be described, the dynamic animation generation system can provide a deep learning framework to produce a large variety of martial arts movements in a controllable manner from unstructured motion capture data. The dynamic animation generation system can imitate animation layering using neural networks with the aim to overcome the typical challenges when mixing, blending and editing movements from unaligned motion sources. The dynamic animation generation system can synthesize novel movements from given reference motions and simple user controls, and generate unseen sequences of locomotion, punching, kicking, avoiding and combinations thereof, but also reconstruct signature motions of different fighters, as well as close-character interactions including clinching and carrying by learning the spatial joint relationships. For achieving this task, the dynamic animation generation system can adopt a modular framework that is composed of the motion generator, that maps the trajectories of a number of key joints and root trajectory to the full body motion, and a set of different control modules that map the user inputs to such trajectories.

One embodiment discloses a computer-implemented method for dynamically generating animation of a virtual character performing certain actions in a virtual environment of an instance of a video game, the method comprising: receiving a current frame of a virtual character within a virtual environment of an instance of a video game, wherein the current frame includes current pose data for the virtual character; identifying a plurality of possible behaviors for the virtual character for the next frame based on the current pose data in the current frame, wherein the next frame is a subsequent frame to the current frame; receiving, from a user of the video game, an input to perform at least a first and second behavior of the plurality of possible behaviors; determining a plurality of pose data for the first and second behavior; performing layering of the plurality of pose data corresponding to the first and second behavior on the current pose data to generate layered data; applying the layered data to a gating network to generate weights; and applying the weights to a pose predictor network configured to generate next pose data for the next frame.

In some embodiments, the gating network receives velocity magnitudes of future joint trajectories for the next pose data, wherein the weights generated by the gating network are blended weights of the future joint trajectories.

In some embodiments, performing layering comprises applying additive layering to the pose data corresponding to the first and second behavior.

In some embodiments, performing layering comprises applying override layering to the pose data corresponding to the first and second behavior.

In some embodiments, performing layering comprises applying blend layering to the pose data corresponding to the first and second behavior.

In some embodiments, the pose predictor network blends weights of a fixed number of structurally identical networks.

In some embodiments, applying the layered data to the gating network comprises applying velocity magnitudes of future joint trajectories for the layered data, wherein generated weights by the gating network comprises blended weights dictating the influence of each of the structurally identical networks.

In some embodiments, the method further comprises applying the current frame with current pose data to the pose predictor network, wherein the pose predictor network is configured to generate next pose data for the next frame based on the current pose data.

Some embodiments include a system comprising one or more processors and non-transitory computer storage media storing instructions that when executed by the one or more processors, cause the one or more processors to perform operations comprising: receiving a current frame of a virtual character within a virtual environment of an instance of a video game, wherein the current frame includes current pose data for the virtual character; identifying a plurality of possible behaviors for the virtual character for the next frame based on the current pose data in the current frame, wherein the next frame is a subsequent frame to the current frame; receiving, from a user of the video game, an input to perform at least a first and second behavior of the plurality of possible behaviors; determining a plurality of pose data for the first and second behavior; performing layering of the plurality of pose data corresponding to the first and second behavior on the current pose data to generate layered data; applying the layered data to a gating network to generate weights; and applying the weights to a pose predictor network configured to generate next pose data for the next frame.

In some embodiments, the next pose data for the next frame does not match pose data previously stored by the system.

In some embodiments, the gating network applies gating variables according to the following:

$$X_i X_i^{\mathcal{M}} = \{C_{i+1}, P_i, g_i\}.$$

In some embodiments, the pose predictor network generates the next pose data according to the following:

$$\mathcal{M}(C_{i+1}, P_i) \rightarrow P_{i+1}.$$

In some embodiments, the operations further comprise: mapping trajectories of a number of key joints and a root trajectory of the virtual character in the current frame, wherein the plurality of possible behaviors are identified based on the mapped trajectories and root trajectory.

In some embodiments, the plurality of possible behaviors for the virtual character for the next frame are identified by a neural network configured to determine possible behaviors for the virtual character for the next frame based on the current frame.

In some embodiments, the plurality of possible behaviors for the virtual character for the next frame are identified by a motion matching system for the virtual character in the instance of the video game.

Some embodiments include a non-transitory computer storage media storing instructions that when executed by a system of one or more processors, cause the one or more processors to perform operations comprising: receiving a current frame of a virtual character within a virtual environment of an instance of a video game, wherein the current frame includes current pose data for the virtual character; identifying a plurality of possible behaviors for the virtual character for the next frame based on the current pose data in the current frame, wherein the next frame is a subsequent frame to the current frame; receiving, from a user of the video game, an input to perform at least a first and second behavior of the plurality of possible behaviors; determining a plurality of pose data for the first and second behavior; performing layering of the plurality of pose data corresponding to the first and second behavior on the current pose data to generate layered data; applying the layered data to a gating network to generate weights; and applying the weights to a pose predictor network configured to generate next pose data for the next frame.

In some embodiments, identifying the plurality of possible behaviors is further based on a distance from an opponent.

In some embodiments, the operations further comprise determining the distance from the opponent based on a root position of the virtual character and a root position for the opponent.

In some embodiments, the operations further comprise determining the distance from the opponent based on a position and velocity information of a body limb for the virtual character and a position and velocity information of a body limb for the opponent.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 3A-3D illustrate example animations of transition layering according to some embodiments.

DETAILED DESCRIPTION OF THE
PREFERRED EMBODIMENT

Overview

This specification describes, among other things, technical improvements with respect to generation of motion for characters configured for use in electronic games. As will be described, a dynamic animation generation system described herein (e.g., the dynamic animation generation system) may implement a machine learning model to generate character movements, such as fighting motions in martial arts. The dynamic animation generation system can layer multiple animations where different animations can be combined to create a single animation.

Figures 1A, 1B, 1C, 1D:
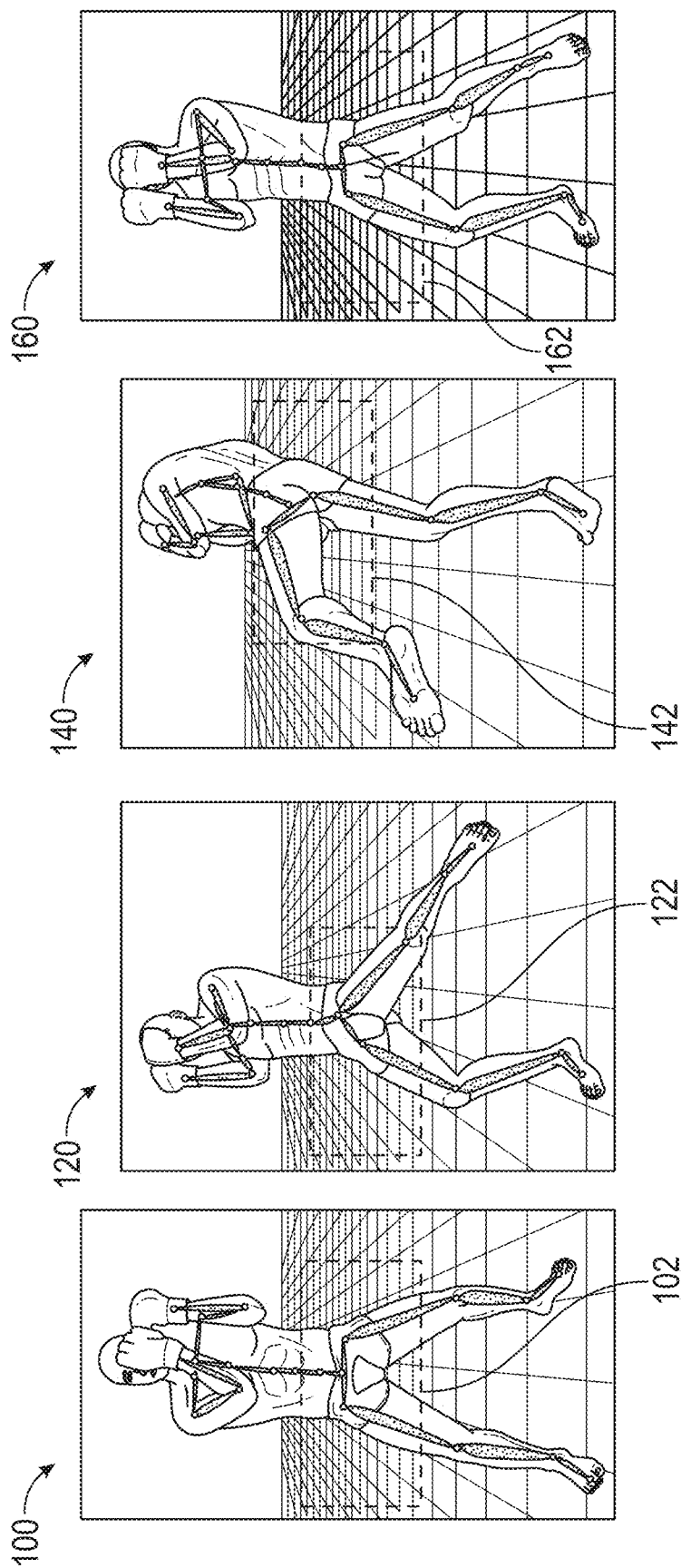
FIGS. 1A-1D illustrate example animations of additive layering according to some embodiments.
Figure 2D:
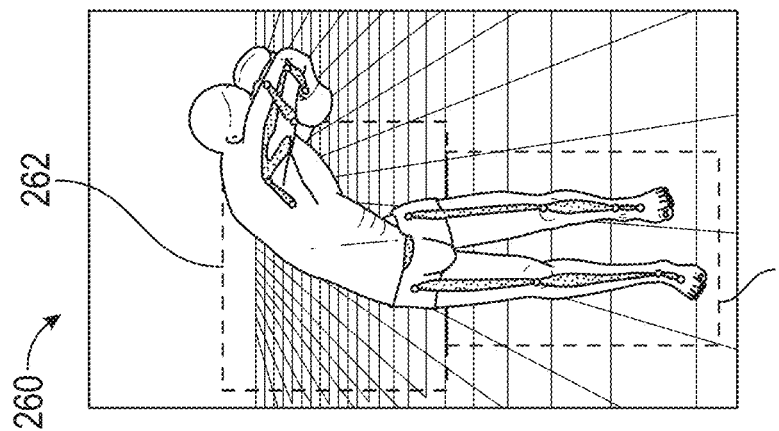
FIGS. 2A-2D illustrate example animations of override layering according to some embodiments.
Figure 2C:
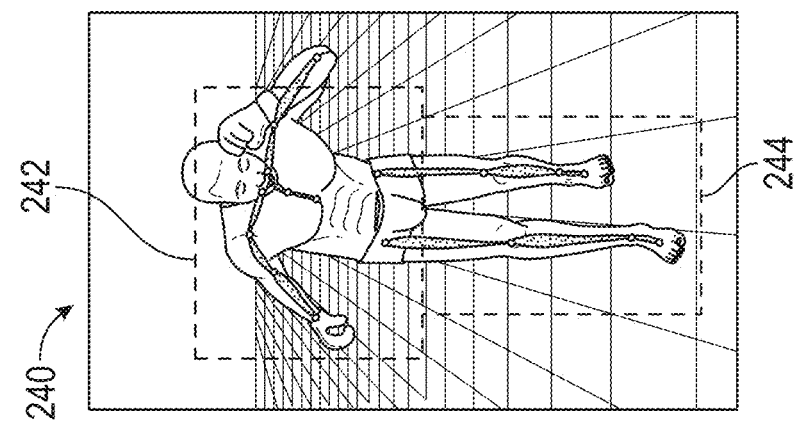
Figure 2B:
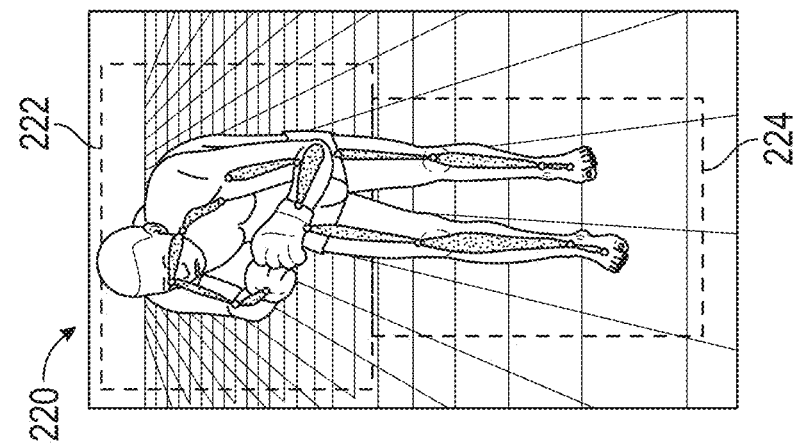
Figure 2A:
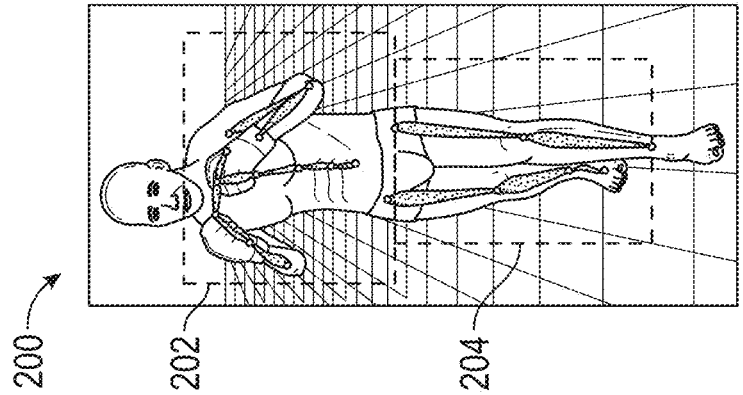

Interactively synthesizing novel combinations and variations of character movements from different motion skills is a key problem in computer animation. Traditional systems apply one of three types of layering. The first type is called additive layering. FIGS. 1A-1D illustrate example animations of additive layering according to some embodiments. In this example, a "standing" layer, where the character animation is simply standing, can be considered a base motion for the character. Then, another layer can be added on top of the "standing" layer, such as a "kicking" and "blocking" layer. FIG. 1A illustrates an example animation of a character applying the "blocking" layer to the "standing" layer. FIGS. 1B-1D illustrate example animations of the character that is blocking and standing, and further applying a "kicking" layer. The "kicking" layer is layered onto the layer of FIG. 1A, which is a combination of the "standing" and "blocking" layers.

When the "kicking" layer is applied, the motion of the hip, the legs, and the joints for "kicking" are layered on top of the motion of the hip, the legs, and the joints for the layer of FIG. 1A. Because the hip for "kicking" is layered on top, the entire body is moving throughout the animation of FIGS. 1A-1D. However, the hips 102, 122, 142, 162 do not appear stable as the character is still maintaining the standing and blocking positions, and thus do not look realistic. Thus, animators typically need to fix the character animation manually in order to rotate the upper body in the other direction so as not to result in this unrealistic motion.

The second type of layering is called override layering. FIGS. 2A-2D illustrate example animations of override layering according to some embodiments. Override layering is where two different motions, for example Motion A and Motion B, are combined by combining the motions for each joint. Thus, the override layering method is different than the additive layering because the override layering is not adding the layer on top of another preexisting base layer, but rather overriding the joint values. However, override layering typically results in disconnected movement of certain parts of the body with other parts. For example, Motion A is to "walk forward" and Motion B is for a "right hook." As shown in FIGS. 2A-2D, the upper body 202, 222, 242, 262 show the character animation performing a "right hook," but the lower body 204, 224, 244, 264 show the character animation performing a "walk forward." Thus, the upper body 202, 222, 242, 262 is disconnected and is moving unrealistically to the lower body 204, 224, 244, 264.

The third type of layering is called transition layering. FIGS. 3A-3D illustrate example animations of transition layering according to some embodiments. Transition layering is where there are two states that are not formally aligned and the traditional systems attempt to reconcile the two states. For example, FIG. 3A illustrates a character in a "fighting ready" stance and FIG. 3D illustrates a "right uppercut" motion. However, transition layering also results in unrealistic motion. For example, FIGS. 3A-3D result in the feet sliding from one position to another. The right foot 302 of FIG. 3A slides to the back position of the right foot 304 of FIG. 3B in order to match the foot positions for the uppercut in FIGS. 3C-3D (right foot here are 306, 308). Again, animators have to spend a great deal of time manually correcting these animations.

Another problem of traditional systems is that traditional systems typically have saved motions for particular motions, such as one motion for dribbling, another for jumping, and another for crouching. However, for example, when combining kicking or punching, there are hundreds of different types of punches and kicking, and thus, creating and assigning hundreds of different labels for punching and kicking are not practical. Traditional systems cannot simply create a label for each type of kick and punch to apply one of the above types of layering, let alone, resulting in unrealistic motions as discussed above.

Interactive applications rendering virtual characters in motion, like video games, virtual reality and various kind of simulations, desire an increasing volume of high quality and controllable animations. Regardless of the source of these animations, motion captured or keyframed, it is time-consuming and technically challenging to explicitly cover the entirety of required movements in a scalable and controllable fashion that is easy to use. Ideally, systems would like to synthesize new motion generalizing from examples using a compact and efficient model that can adapt to unseen situations and novel user inputs. Recently, data-driven approaches have been demonstrated being capable of learning such models, but they come with some key challenges: First, end-to-end systems concatenate control signals as conditions on top of the animations in order to guide the character movements by the user. However, since those features are often abstract, such as style labels or simplified goal variables to cause an action, the prediction can lead to averaging artifacts due to the inherent ambiguity in the input signal. Particularly for martial arts movements, defining such features to accurately cover all possible motion variations can be very challenging. Second, selecting the right features to control the movements is often task-specific, forcing retraining of the entire system not only whenever the application space changes, but also until the appearance of learned movements becomes as desired. This leads to increasingly long iteration times and can become infeasible for very large datasets. Lastly, such methods typically do not provide a transparent interface for animators to intuitively control the motion generation process. It is often not only unclear how to define such control features, but also how the network responds to them and sometimes also how to provide, combine or modify them by the user during runtime.

In some embodiments, the dynamic animation generation system addresses such issues using a deep learning framework capable of synthesizing fighting animations from given references movements into novel and unseen sequences, combinations or variations thereof in a controllable manner. The dynamic animation generation system can overcome the issues of traditional blending and layering techniques common in games, which suffer from artifacts that violate physics and often break the character pose in unnatural configurations, and without requiring changes in the workflows that animators are used to. The dynamic animation generation system can synthesize a large variety of character movements and actions, including locomotion, punching, kicking, avoiding and character-interactions in high quality while avoiding intensive manual labour when working with unstructured large-scale datasets. In some embodiments, motion can be generated for biped and/or human characters. In some embodiments, motion can be generated for quadruped characters.

Figure 4A:
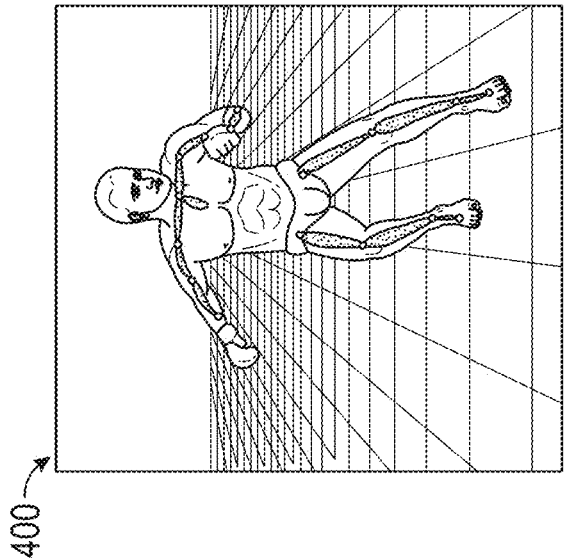
FIGS. 4A-4E illustrate example animations by the dynamic animation generation system by applying neural networks according to some embodiments.
Figure 4B:
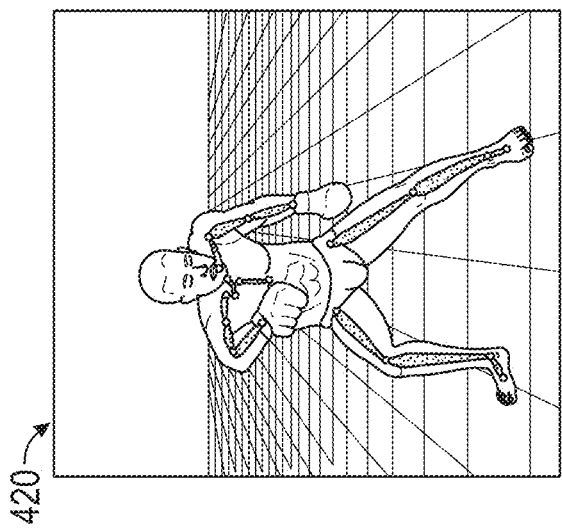
Figure 4C:
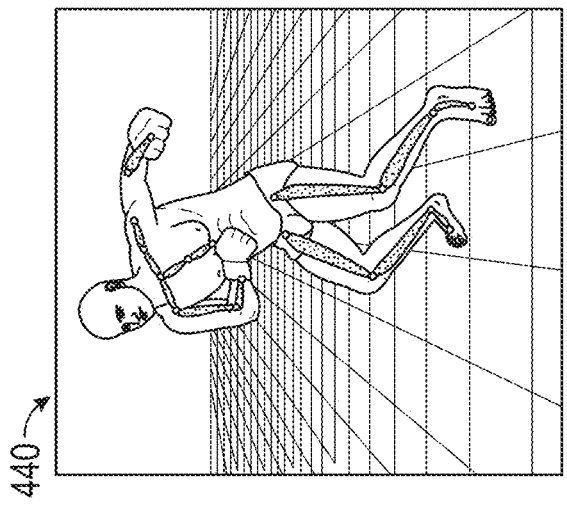
Figure 4D:
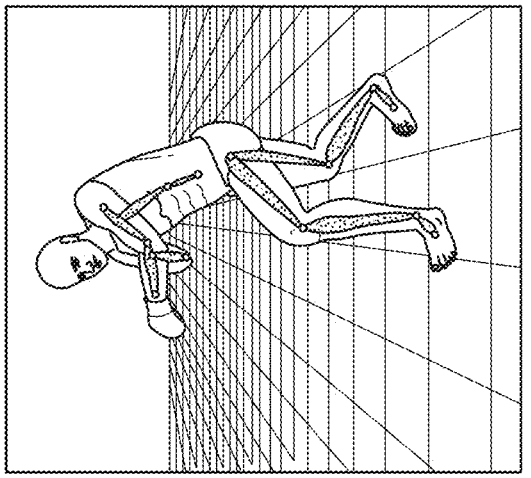
Figure 4E:
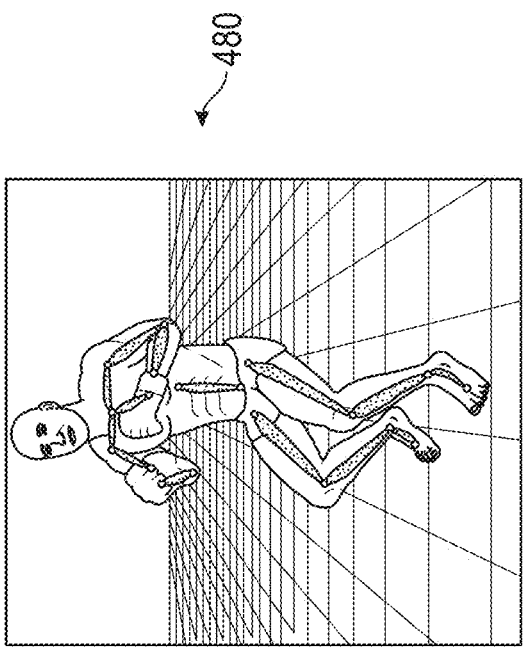

In some embodiments, the dynamic animation generation system alleviates and mitigates the issues above by applying a neural network to combine a plurality of different motions. FIGS. 4A-4E illustrate example animations by the dynamic animation generation system by applying neural networks according to some embodiments. In this example, the dynamic animation generation system combines a "right punch" with a "left punch" animation. FIGS. 4A-4B illustrate the character performing a "right punch." The character animation transitions to FIGS. 4C-4E where the character performs a "left punch." The punches are performed realistically and are automatically generated by the dynamic animation generation system. The limbs of the characters are sharp and smooth, the upper body and the lower body are connected, and the feet are not sliding in motion. The dynamic animation generation system performs layering inside the trajectory space and feeds the layered output to a neural network instead of providing the neural network with pose information directly.

In some embodiments, the dynamic animation generation system can receive input from the user, such as from a controller, to perform a series of actions. The dynamic animation generation system can generate character animation that performs the motions, such as a kick and punch, while also appearing realistic.

In some embodiments, the dynamic animation generation system can provide a deep learning framework to produce a large variety of martial arts movements in a controllable manner from unstructured motion capture data. The dynamic animation generation system can imitate animation layering using neural networks with the aim to overcome the typical challenges when mixing, blending and editing movements from unaligned motion sources. The dynamic animation generation system can synthesize novel movements from given reference motions and simple user controls, and generate unseen sequences of locomotion, punching, kicking, avoiding and combinations thereof, but also reconstruct signature motions of different fighters, as well as close-character interactions including clinching and carrying by learning the spatial joint relationships. For achieving this task, the dynamic animation generation system can adopt a modular framework that is composed of the motion generator, that maps the trajectories of a number of key joints and root trajectory to the full body motion, and a set of different control modules that map the user inputs to such trajectories. The motion generator functions as a motion manifold that not only projects novel mixed/edited trajectories to natural full-body motion, but also synthesizes realistic transitions between different motions. The control modules are task dependent and can be developed and trained separately by engineers to include novel motion tasks, which greatly reduces network iteration time when working with large-scale datasets. The dynamic animation generation system provides a transparent control interface for animators that allows modifying or combining movements after network training, and enables iterative adding of different motion tasks and behaviors. The dynamic animation generation system can be used for offline and online motion generation alike, and is relevant for real-time applications such as computer games.

Dynamic Animation Generation System Architecture

Figure 5A:
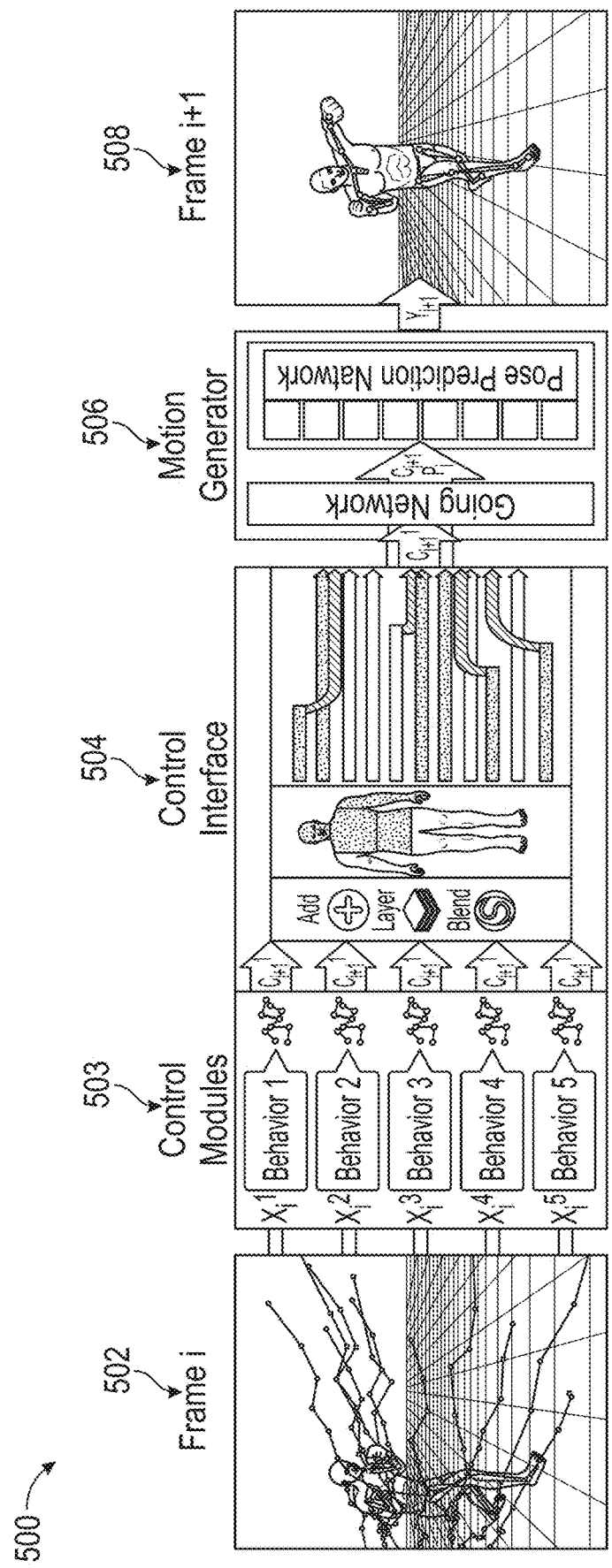
FIG. 5A illustrates an example architecture of the dynamic animation generation system according to some embodiments.
Figure 5B:
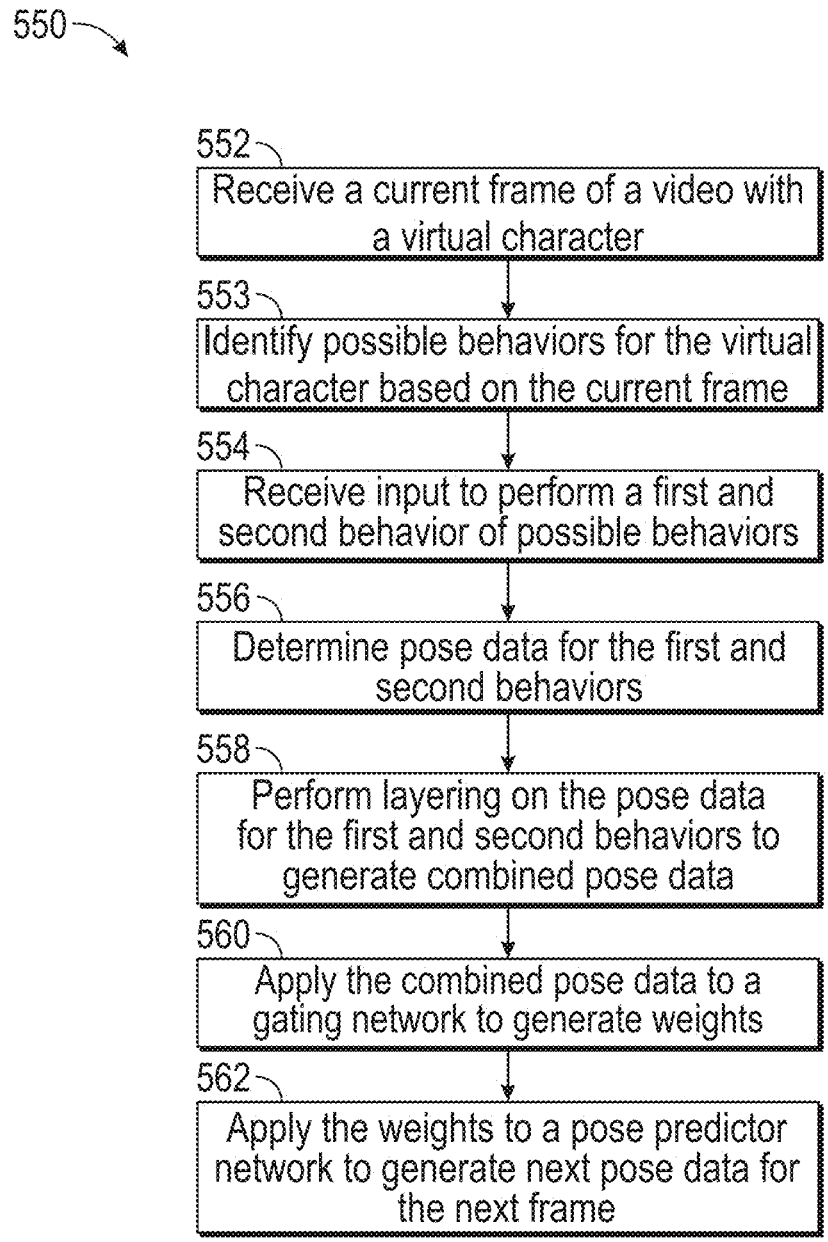
FIG. 5B illustrates a block diagram of the dynamic animation generation system according to some embodiments.

FIG. 5A illustrates an example architecture 500 of the dynamic animation generation system according to some embodiments. FIG. 5B illustrates a block diagram of the dynamic animation generation system according to some embodiments. The example architecture 500 of the dynamic animation generation system can include a current frame i 502, control modules 403, a control interface 504, a motion generator 506, and the next predicted pose 508.

In some embodiments, the current frame i 502 can be a current frame of a virtual character within a virtual environment of an instance of a video game. The current frame can include current pose data for the virtual character, such as joint trajectory information. For example, at block 552, the dynamic animation generation system can receive a current frame of a video with a virtual character, such as frame i 502.

In some embodiments, the dynamic animation generation system can utilize a set of independent control modules for different actions or behaviors: these controllers can be in form of another neural network, an existing motion sequence or another suitable computational framework, where each of the controllers produce future motion trajectories going into a shared control interface. At block 553, the dynamic animation generation system can identify possible behaviors for the virtual character based on the current frame. The control modules 503 can include a number of behaviors, such as behavior 1, 2, 3, 4, 5, that can be performed from the current frame i 502. For example, behavior 1 can be an idling behavior, behavior 2 can be a punch, behavior 3 can be a kick, behavior 4 can be a neural network that generates some trajectories for a given opponent motion, and so on. The control modules 503 can generate joint trajectories for each of the different behaviors. In some embodiments, the joint trajectories for the behaviors can be generated by a neural network. In other embodiments, the joint trajectories for the behaviors are generated by a motion matching system for a character in a current instance of a virtual environment for a video game. In other embodiments, the joint trajectories for the behaviors are generated by any animation system that gives you a set of trajectories for motions to be followed for different behaviors and tasks.

Figure 6:
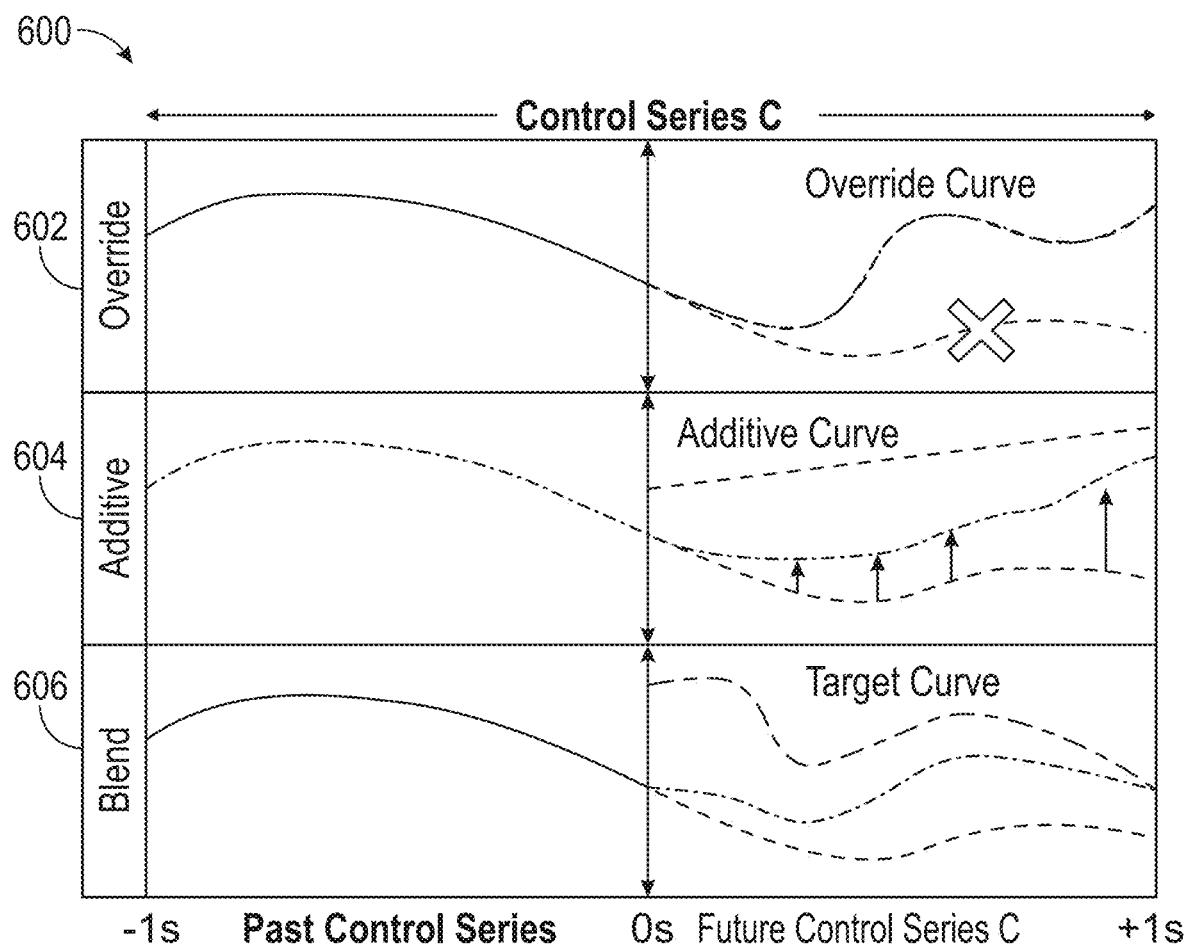
FIG. 6 illustrates an example of override, additive, and blend layering according to some embodiments.

In some embodiments, the control modules 503 can send joint trajectories to the control interface 504. The control modules 503 sends joint trajectories of the possible movements that the user can perform from the animation character position in Frame i 502. The control interface 504 can receive input, such as from a user, to perform a plurality of motions. At block 553, the dynamic animation generation system can receive, from a user of the video game, an input to perform at least a first and second behavior of the plurality of possible behaviors. The control interface 504 can apply additive layering, override layering, and/or blending to certain groups of behaviors, such as the plurality of motions that the user would like to perform. For example, the control interface 504 can apply additive layering with a punch motion on top of a crouch motion to the animation character in Frame i 502, such that the resulting joint trajectories are for an animation character that is performing a punch in a crouch position. The joint trajectories for the crouching punch is used to control the animation character to perform the new motion. At block 558, the dynamic animation generation system can perform layering, such as additive, override, or blending, on the pose data for the first and second behaviors to generated combined pose data. FIG. 6 illustrates an example of override 602, additive 604, and blend 606 layering. In the override 602 layering, based on the past control series, the signal appears to be moving downward according to some embodiments. However, the signal is overridden to curve upward. In additive layering 604, the system adds to the signal that moves downward based on the past control series to move the signal upward by certain amounts. The blend layering 606 blends the expected movement with the target curve.

In some embodiment, the control interface 504 can send the joint trajectories for the crouching punch motion to a motion generator 506. The motion generator 506 predicts the next pose that would be inside the set of joint trajectories that are received from the control interface 504, such as the joint trajectories for the crouching punch motion. The motion generator 506 take the combined joint trajectories for the crouching punch motion and generates the new movement. The motion generator 506 can include a gating network and a pose predictor to generate next pose data for the next frame i+1 508. For example, at block 560, the dynamic animation generation system can apply the combined pose data to a gating network to generate weights. At block 562, the dynamic animation generation system can apply the weights to a pose predictor network to generate next pose data for the next frame.

Thus, the dynamic animation generation system can learn the entire manifold of movements from unstructured motion capture data within a compact network, which takes as input a dense signal of key joint trajectories. This signal can successfully reconstruct a large variety of attacking, defending or interaction behaviors typical of martial arts in a task-agnostic fashion and with high fidelity, even including stylistic signature movements of different fighters.

Neural Network Animation Layering Framework

In some embodiments, the deep learning framework is a time-series system that predicts the character pose from one frame into the next in an autoregressive fashion, where layering and motion progression is done at one step, such as within the control interface 504, and aims to decouple the motion generation process from the control process. First, the distribution of all unstructured motion capture data is learned with a motion generator network (described further herein), which is able to accurately reproduce the original animation and generalize to novel, unseen states. This network is trained to produce a character pose that follows a subset of motion trajectories, with the effect of compressing the entire data into a single network in a task-agnostic manner. After the motion generator network is trained, different control modules (such as control modules 503) can be independently created to purposely drive the motion synthesis. These can be in form of neural networks, heuristic-based controllers, existing reference motion clips, or user-driven editors, with one shared property: producing the future trajectories that are going into a common control interface (such as the control interface 504). This intermediate interface provides a transparent control scheme for artists or users to layer, blend and edit the character movement as desired. Afterwards, when the new trajectories are given to the motion generator 506, a novel unseen animation can be generated from the entire motion manifold. In addition, since the motion generator 506 does not have to be retrained when the controllers are being created or modified, this modular approach reduces iteration times during development and allows shifting the process of tuning the motion generation from before-to-after network training.

Motion Generator

In some embodiments, the motion generator 506 can include a gating network and a pose predictor network. The pose predictor network is constructed by blending the weights of a fixed number of structurally identical networks, called experts, according to a set of learned blending weights. The pose predictor network takes in as input the control series to guide the motion, plus the pose data of the current frame, and outputs the character pose for the next frame. In the dynamic animation generation system setup, a Control Series C, as shown in Eq. (1) with a total of L=1+N channels, where $T_i$ is the root trajectory in 2D space and $M_{i,j=1,\ldots,N}$ is a set of N key joint trajectories in 3D space, each covering a window of one second in both past and future around frame i.

$$C_i = \{C_{i,1}, \ldots, C_{i,L}\} = \{T_i, M_{i,1}, \ldots, M_{i,N}\} \qquad (1)$$

In some embodiments, the gating network takes as input the velocity magnitudes of the future joint trajectories, and outputs the blending weights that dictate the influence of each expert. The gating can segment the movements equally based on the low and high-frequency components of the motion, covered by a dense series of joint velocities, in order to follow a given reference motion well.

Structurally, the motion generator $\mathcal{M}$ can be formulated as Eq. (2), mapping the current pose P at frame i to the pose at frame i+1, using the control series of frame i+1:

$$\mathcal{M}(C_{i+1}, P_i) \rightarrow P_{i+1}. \qquad (2)$$

In some embodiments, the motion generator 506 can be trained on very large-scale datasets covering different motion skills and behaviors, without requiring manual supervision. The joint trajectories mitigate ambiguity in the input, effectively compressing several gigabytes of motion captured data into a model that can both reproduce very specific motion and synthesize animations that are not present in the training data. After training the network, editing, blending as well as layering joint trajectories as control to the motion generator 506, instead of carrying similar operation directly on the animation data, demonstrates significant advantages: Since the motion generator 506 essentially learns the manifold of plausible motion from the training data, the motion generator 506 acts as a projection operator on said manifold, avoiding unrealistic poses and jerkiness in the motion, and generalizes to novel movements and transitions between them while following the given reference trajectories.

Control Modules

In some embodiments, the purpose of the control modules 503 is to represent a specific behavior $\mathcal{B}$ that outputs future control trajectories to be followed by the character. Control modules 503 can include neural networks, physics-based simulations, non-parametric systems such as motion matching, animation clips or user-driven tools that enable editing the trajectories themselves directly. The dynamic animation generation system can makes it easy to swap or even combine higher-level modules to focus on different tasks, where each module can define its very own inputs if necessary. Structurally, the function for the control modules can be formulated as $$\mathcal{B}_k(\cdot) \rightarrow \hat{C}_{i+1}{}^k k \in 1, \ldots K, \qquad (3)$$

where each controller $\mathcal{B}_k(\cdot)$ for behavior k maps its input to a future control series $\hat{C}_{i+1}{}^k$ of the next frame. Their combination by different layering techniques is performed by the control interface are discussed in Section 3.3.

Idling behavior: In some embodiments, in order to produce idling animations when the character is standing still, the dynamic animation generation system can take a small set of reference controls extracted from existing motion clips that are characteristic for each fighter. Afterwards, the controls can be interactively modified into several full-body pose variations via additive layering using an offset vector (see FIG. 10, middle row, explained further below). Additionally, the dynamic animation generation system is easy to use since the dynamic animation generation system can allow for randomly switching between different reference clips and obtain smooth transitions between them.

Locomotion behavior: In some embodiments, locomotion is generated by training another neural network by using local phase variables (one for each foot). However, instead of directly producing the output pose, the dynamic animation generation system can predict a future control series of the locomotion in order to be combined with other behaviors in the control interface. With that the dynamic animation generation system can synthesize unseen combinations of locomotion with actions like blocking and punching movements.

Attacking and Targeting behavior: In some embodiments, performing a specific attack is initially done in a similar fashion like for idle behavior by selecting a short reference sequence from the data. By that the dynamic animation generation system can provide the animator with intuitive control about the initial appearance of a fighting skill. Afterwards, the dynamic animation generation system can combine and modify different attacking behaviors using the control interface to synthesize double-punches and natural kick-and-punch sequences of different timings that have not been part of the original training data.

When trying to hit an opponent, the relative configuration and offsets between two characters in runtime in most cases will not match that during training. Therefore, the dynamic animation generation system can apply a redirected control scheme that learns how to modify a given reference motion relative to an opponent in order to land an attack. Essentially, the dynamic animation generation system can define a redirected space between character A and its opponent B by computing an aligned root direction from A's root position to B's root position. The targeting module is then trained by another network and takes the current control series and the opponent pose as input in the own character space, and again predicting the same control series in the opponent space using the redirected root space. In effect, learning trajectories in this space enables the network to redirect a given control depending on the configuration between both characters in order to match the current runtime situation, particularly when the characters are rotating fast.

Hit Reactions and Avoidance behavior: In some embodiments, to synthesize hit reaction behaviors, the traditional systems did not have paired-up data inside motion capture. Therefore, extracting a dense signal in order to learn a reaction over a longer time-window, such as getting hit and stumbling back before recovering, may be challenging. Therefore, the dynamic animation generation system can utilize a nearest neighbor search that matches the incoming velocity vector and position between two impacting body regions. Afterwards, the dynamic animation generation system can modify the root trajectory via additive layering to adjust the stumbling direction of the hit reaction before reconstructing the animation by the Motion generator. If instead controlling the character to avoid an attack, the dynamic animation generation system can apply another network that takes as input the entire control series of the opponent, and from that learns to produce suitable future trajectories for the own character. To connect two characters and making them responsive to the motion of the opponent, the same concept of redirected control can be used. The difference is instead of predicting the same attacking motion in the redirected space, the dynamic animation generation system can predict the reaction trajectories in that space. From that, the avoiding movement changes depending on the relative location of both characters as well as based on the attacking action being performed.

Clinching and Carrying behavior: In some embodiments, to produce close-interaction movements such as clinching and carrying, another control module is trained that generates the motion trajectories of the character. Considering the dynamic animation generation system can have a subdominant fighter that is controlled by a dominant opponent, the dynamic animation generation system can first select a reference motion for the latter and can interactively modify its curves by additive layering.

Control Interface

In some embodiments, the generated future control trajectories from the control modules 503 pass through the shared control interface, where they can be mixed via override, additive or blending layering. Advantageously, this enables producing combinations and variations of separate motion skills on a control-level passed to the motion generator 506, instead performing said operations directly on a pose-level. Structurally, the task of the control interface 504 is to compute a combined future control series by a layering operator $\mathcal{L}$ as denoted below:

$$\hat{C}_{i+1} = \mathcal{L}(\hat{C}_{i+1}^1, \ldots, \hat{C}_{i+1}^K). \tag{4}$$

The override layering operator can include mixing curve channels from different control series into one. For example, this can be selecting the lower body curves from a walking or kicking behavior with the upper body curves from a punching or blocking behavior (see FIG. 8 below for more information). This operation can be defined as follows:

$$\mathcal{L}_O : \hat{C}_{i+1} = \{\hat{C}_{i+1,1}^{S_1}, \ldots, \hat{C}_{i+1,L}^{S_L}\}$$

$$S_{1,\ldots,L} \in \{1, \ldots, K\}. \tag{5}$$

IN some embodiments, the additive layering function modifies the current control series by an additional signal for a set of selected channels. This signal can be in form of a scalar to adjust speed or distance, a vector to control position or direction, an entire control series or another customized function:

$$\mathcal{L}_A : \hat{C}_{i+1} = \hat{C}_{i+1} + \{s_1 T, s_2 M_1, \ldots, s_L M_N\}$$

$$S_{1,\ldots,L} \in \{0,1\}. \tag{6}$$

In some embodiments, a blending operation can be performed to transition from a current control series into another new control series:

$$\mathcal{L}_B : \hat{C}_{i+1} = (1-s)\hat{C}_i + s\hat{C}_{i+1}$$

$$s \in [0,1]. \tag{7}$$

Using these three operators, the dynamic animation generation system can synthesize a large variety of combinations and variations of different motion skills in an intuitive and transparent manner.

System Inputs and Outputs

In some embodiments, the extracted features can live in a time series window $\mathcal{T}_{-1s}^{1s} = 13$ that can cover information of up to 13 uniformly-sampled points within is in the past and future (each 6 samples) around the additional centered root sample at current frame i. Given the state variables of the character in the previous frame i−1 and the current frame i, the dynamic animation generation system can include a time-series model that predicts those of the character in the next frame i+1.

Motion Generator

Inputs: In some embodiments, the input vector for the motion generator 506 includes a control series, the current character pose and the motion generator gating variables:

$X_i^M = \{C_{i+1}, P_i, g_i\}$.

In some embodiments, the control series $C_{i+1} = \{T_{i+1}, M_{i+1,1}, \ldots, M_{i+1,N}\}$ is used as control series input for the motion generator. N=11 is the number of key joint. The control series is sampled from next frame i+1 and transformed into the root space of frame i. Each element of control series is sampled in the past-to-future time window $\mathcal{T}_{-1s}^{1s} = 13$.

Root Trajectory $T_{i+1}$: For controlling the character root motion, the root trajectory defines the horizontal path of trajectory positions $T_{i+1}^p \in \mathbb{R}^{2\mathcal{T}}$, trajectory directions $T_{i+1}^r \in \mathbb{R}^{2\mathcal{T}}$, trajectory velocities $T_{i+1}^v \in \mathbb{R}^{2\mathcal{T}}$, integrated lengths $T_{i+1}^l \in \mathbb{R}^{\mathcal{T}}$ and integrated angles $T_{i+1}^a \in \mathbb{R}^{\mathcal{T}}$.

Motion Trajectory $M_{i+1}^j$, j∈1, . . . , N: A series of 3D transformations and velocity for each of N=11 key joints, represented by position, up direction and forward direction $M_{i+1,j}^t \in \mathbb{R}^{9\mathcal{T}}$ and its position velocity $M_{i+1,j}^v \in \mathbb{R}^{3\mathcal{T}}$. The key joints are chosen as hips, left/right upper/lower leg, left/right upper/lower arm, spine, and head.

Character Pose $P_i = \{p_i, r_i, v_i\}$ is the pose and velocity of the character at the current frame i with B=26 bones.

Gating Input $g_i$: The magnitudes of joint velocities $g_i \in \mathbb{R}^{\mathcal{T}N}$ from the future control series sampled at Motion generator.

Outputs: The output vector $Y_{i+1}^{MG} = \{P_{i+1}, c_{i+1}, F_{i+1}\}$ for the next frame i+1 is computed by the motion generator network to generate pose, contacts and hand pose, as it is described bellow.

Predicted Pose $P_i = \{p_{i+1}, r_{i+1}, v_{i+1}\}$ is the pose and velocity of the character for the next frame i+1 with B=26 bones.

Contacts $c_{i+1}$ Binary contact switches for the feet joints.

Finger Transformations $F_{i+1}$ The dynamic animation generation system can predict the joint transformations of the fingers relative to their wrist spaces to recover the hand pose from the Motion generator.

Control Modules

Inputs: Depending on the task each control module fulfils, the control modules 503 can require different input. For example, locomotion module input requires root trajectory, avoidance module input requires opponent's pose and motion trajectory, and hit reaction module input required attacking direction and velocity.

Outputs. Control module outputs can include a future control series $\hat{C}_{i+1}$ of the next frame. The format of $\hat{C}_{i+1}$ is exactly as the same as $C_{i+1}$ except for the fact that each element of control series is sampled in the current-to-future time window $\mathcal{T}_{0s}^{1s} = 7$.

For different modules, additional output may be generated.

Network Training

In some embodiments, the training can be performed by normalizing the input and the output of the entire dataset by their mean and standard deviation and first training the motion generator. Afterwards, the dynamic animation generation system can utilize different techniques to start querying this compact network that has learned to reconstruct and progress the motion manifold. The dynamic animation generation system can then train the control modules for locomotion, targeting, avoidance and close-interactions separately depending on the task. The data for training can include a large variety of martial arts movements, including signature movements of different fighters, and interaction movements. The data is partially paired up for close-interaction movements. The data is processed and used for training the networks. For training each network, the dynamic animation generation system can use the same network architecture but different inputs/outputs. The learning rate is initialized with a value of $1.0 \cdot 10^{-4}$ and later adjusted by the weight decay rate with the initial value of $2.5 \cdot 10^{-3}$. Dropout rate is set to 0.3, hidden layer size in the gating network is set to 128 and in the pose prediction network to 512 respectively. The complete dataset can consist of unstructured motion capture data, and is not augmented with any assigned labels for actions, styles or goal variables. The complete dataset is doubled by mirroring, downsampled from 60 Hz capture to 30 Hz, and then exported twice by shifting the data by one frame. Advantageously after training, the data can be compressed, such as from ~300 GB generated training data to ~46 MB network weights. In addition, the reference trajectories, such as for different attacking, idling or hit reaction sequences, were stored in a small database with a total of ~11 MB.

Character Control System

Figure 7:
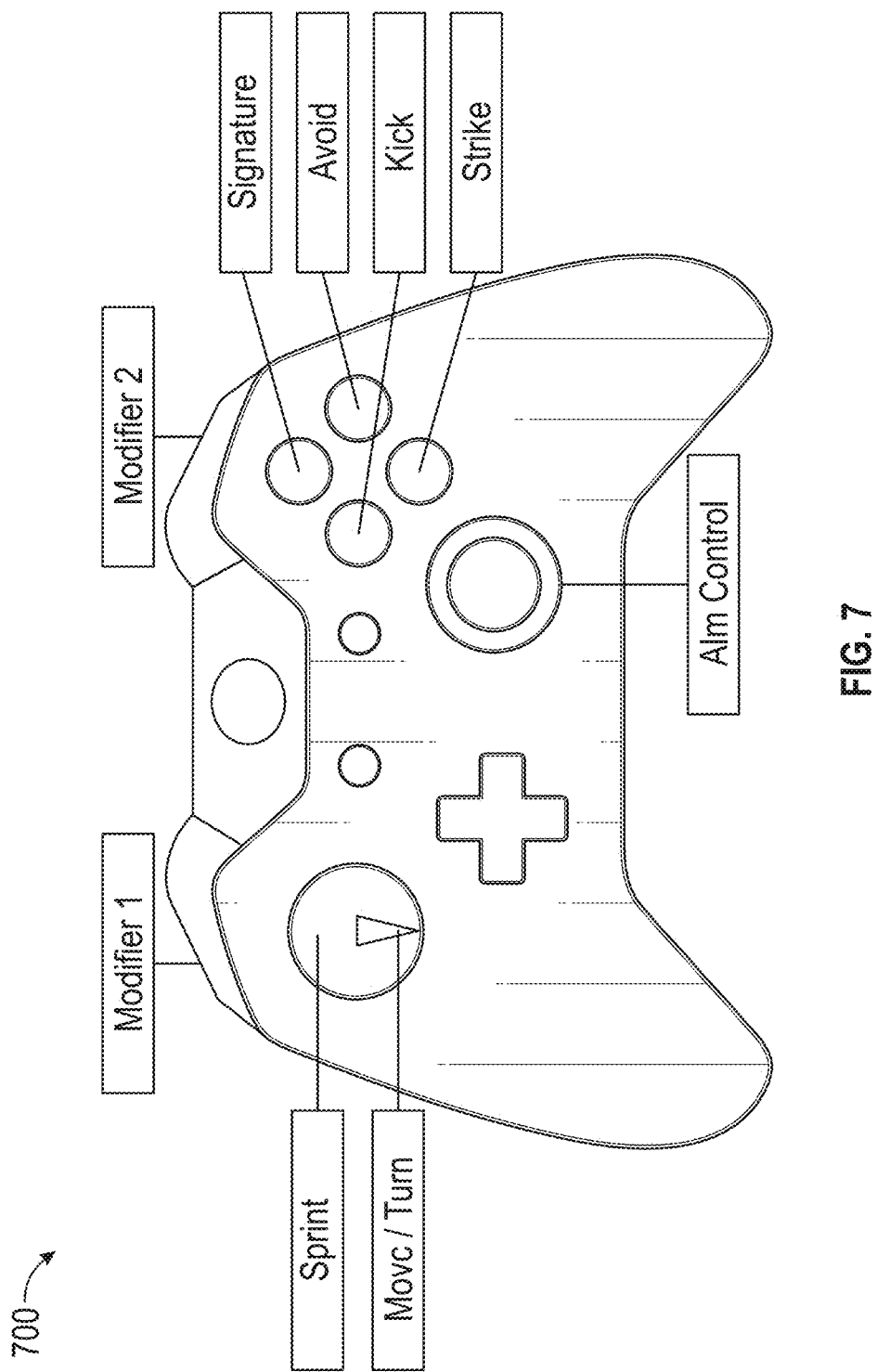
FIG. 7 illustrates an example gamepad for a user according to some embodiments.

In some embodiments, the character is controlled by a gamepad's joysticks and buttons to offer a wide range of control signals to the user. FIG. 7 illustrates an example gamepad for a user according to some embodiments. The mapping between the user input to the actions are designed as follows: The translation and rotation motion are driven by the left joystick; when the joystick is simply tilted, the character moves to the direction without changing the orientation. When the joystick is rolled, its rotation is integrated overtime and the character turns its facing direction. When the joystick is pressed, the character sprints. The A and X buttons are assigned to launch regular punching or kicking attacks. The B and Y buttons are assigned to trigger a signature motion or to attempt avoiding an incoming attack. The left and right trigger buttons are used to perform more advanced attacking behaviors. Pressing multiple buttons at the same time causes the movements to become combined via override layering in the control interface: For each reference motion, layers have been assigned to the motion curves to represent their importance (i.e. the punching movements have a higher layer assigned to the arm joints and the kicking movements for the legs respectively). By using the right joystick, the user can control a vector that is additively layered to the current control curves. All curve channels are combined via lerp and slerp operations for position and rotation respectively.

Animated Results

Figure 8:
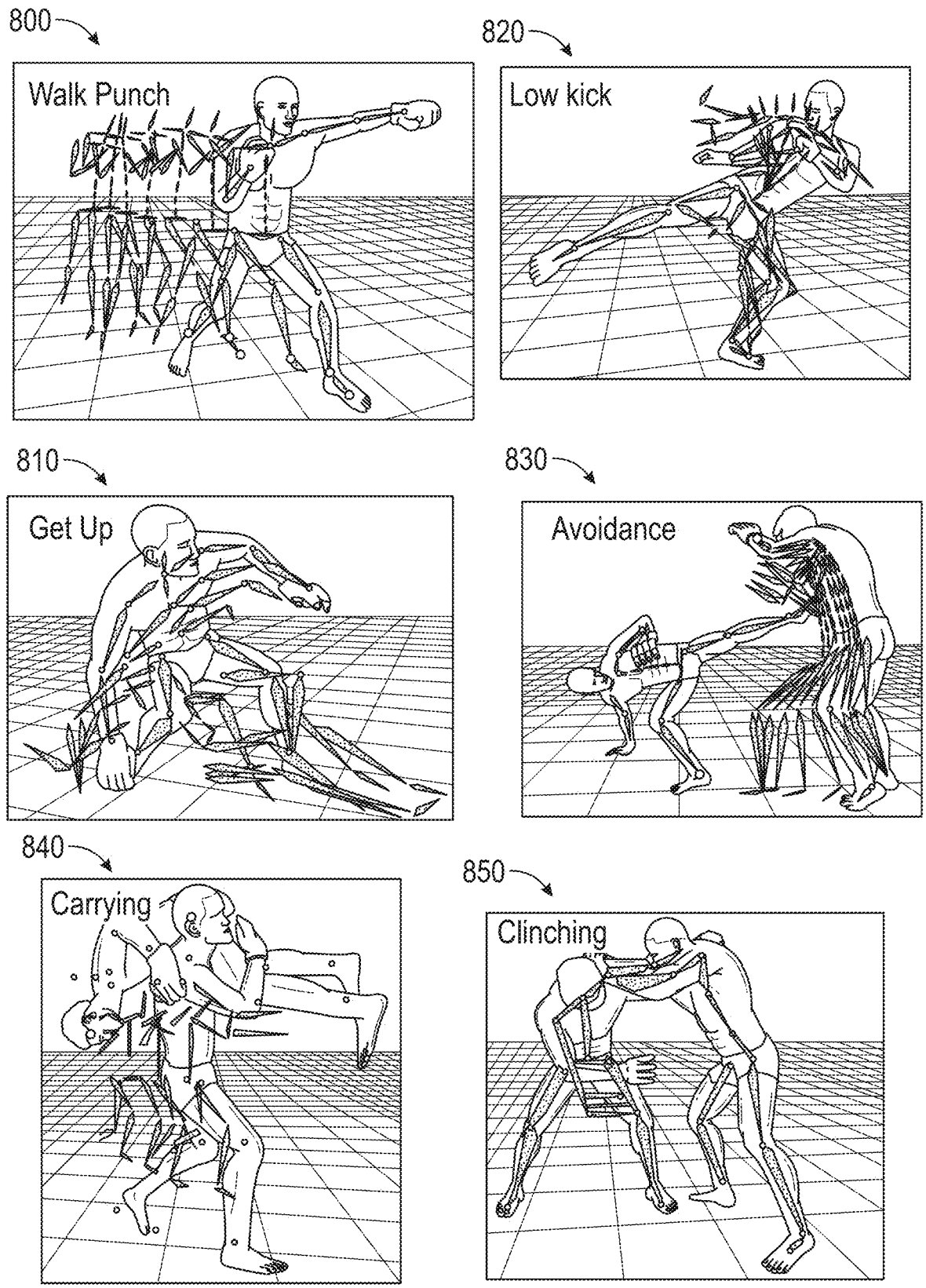
FIG. 8 illustrates a selection of animated results showing the characters performing different motion skills according to some embodiments.

FIG. 8 illustrates a selection of animated results showing the characters performing different motion skills according to some embodiments. The Walk Punch 800 was produced by layering generated locomotion curves with those of a selected punching sequence. Modifying a kicking reference motion by a negative height offset generated the Low Kick animation 820. Starting from an unseen pose on the ground, a natural transition for an unaligned Get Up 810 reference motion could be synthesized. By learning from the motion trajectories of an attacking opponent, the network can produce a suitable Avoidance motion 830. Lastly, the learned spatial constraints were used enabled to accurately reconstruct Carrying 840 and Clinching 850 movements between two interacting characters.

Override Motion Layering

Figure 9:
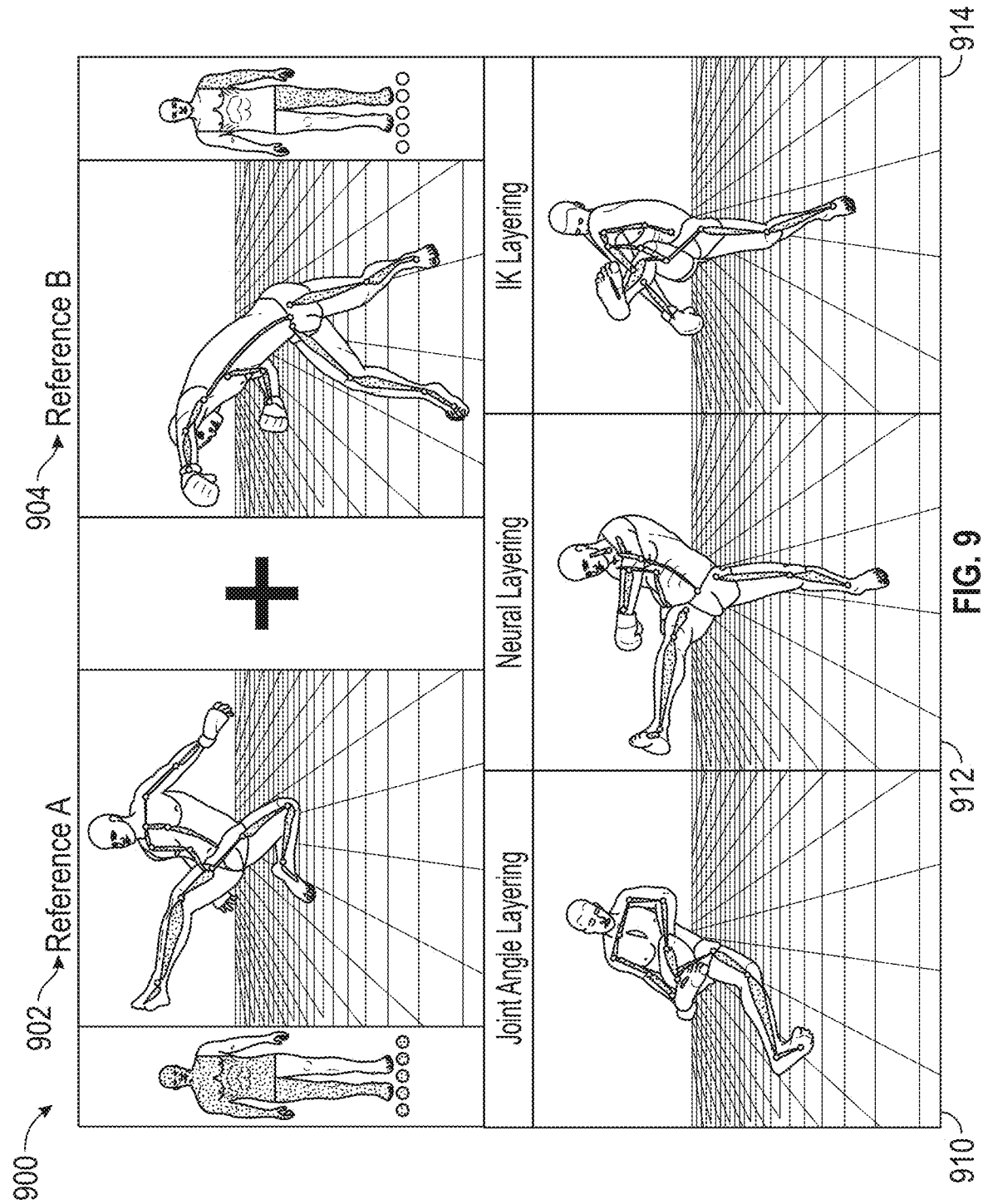
FIG. 9 illustrates combining two significantly different movements for a character doing a flying-kick and a strong punch with both feet planted on the ground according to some embodiments.

In this section, the dynamic animation generation system can be used to combine movements from different motion skills via override layering into a new animation while maintaining the context of the original movements. FIG. 9 illustrates combining two significantly different movements 900 for a character doing a flying-kick 902 and a strong punch with both feet planted on the ground 904 according to some embodiments. From that, the dynamic animation generation system can generate a novel animation that combines the motion of the kicking character with the left arm and leg of the punching character 910, 912, 914. Due to the significant difference between both movements, commonly applied layering techniques using either joint angles or inverse kinematics leads to unnatural poses or self-collisions in the resulting movements. Using the dynamic animation generation system by copying the joint trajectories of the selected channels, the dynamic animation generation system can produce novel and realistic combined animation with minimal effort.

Figure 10:
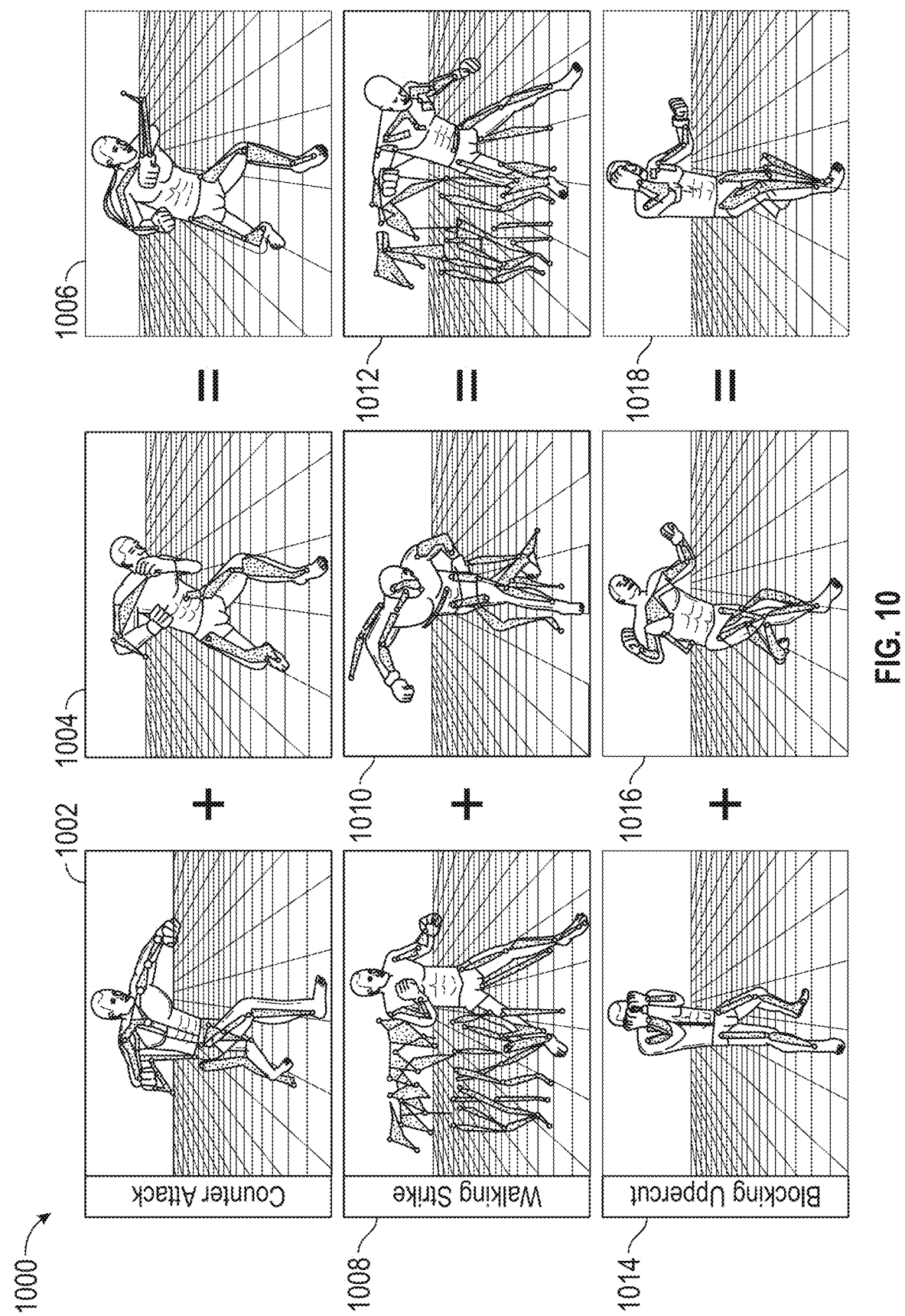
FIG. 10 illustrates three examples of combining two significantly different movements according to some embodiments.

FIG. 10 illustrates three examples of combining two significantly different movements 1000 according to some embodiments. The dynamic animation generation system can combine punching 1004 and avoiding into a counter attack 1002 to perform a combined motion 1006. The dynamic animation generation system can combine a strike 1010 while walking 1008 to perform a combined motion 1012. The dynamic animation generation system can combine an uppercut 1016 while blocking with the other hand 1014 to perform a combined motion 1018.

The dynamic animation generation system can reliably produce believable results that do not require additional cleanup to resolve self-collisions or joint limit violations. The dynamic animation generation system can combine motions with high quality while not being sensitive to time-alignment: for example, while layering a kick and a punch, shifting the start of the punch animation at different frames generates variations in the final animation that still appear believable. All generated movements do not exist as such combinations in the original training data.

Additive Motion Layering

Figure 11:
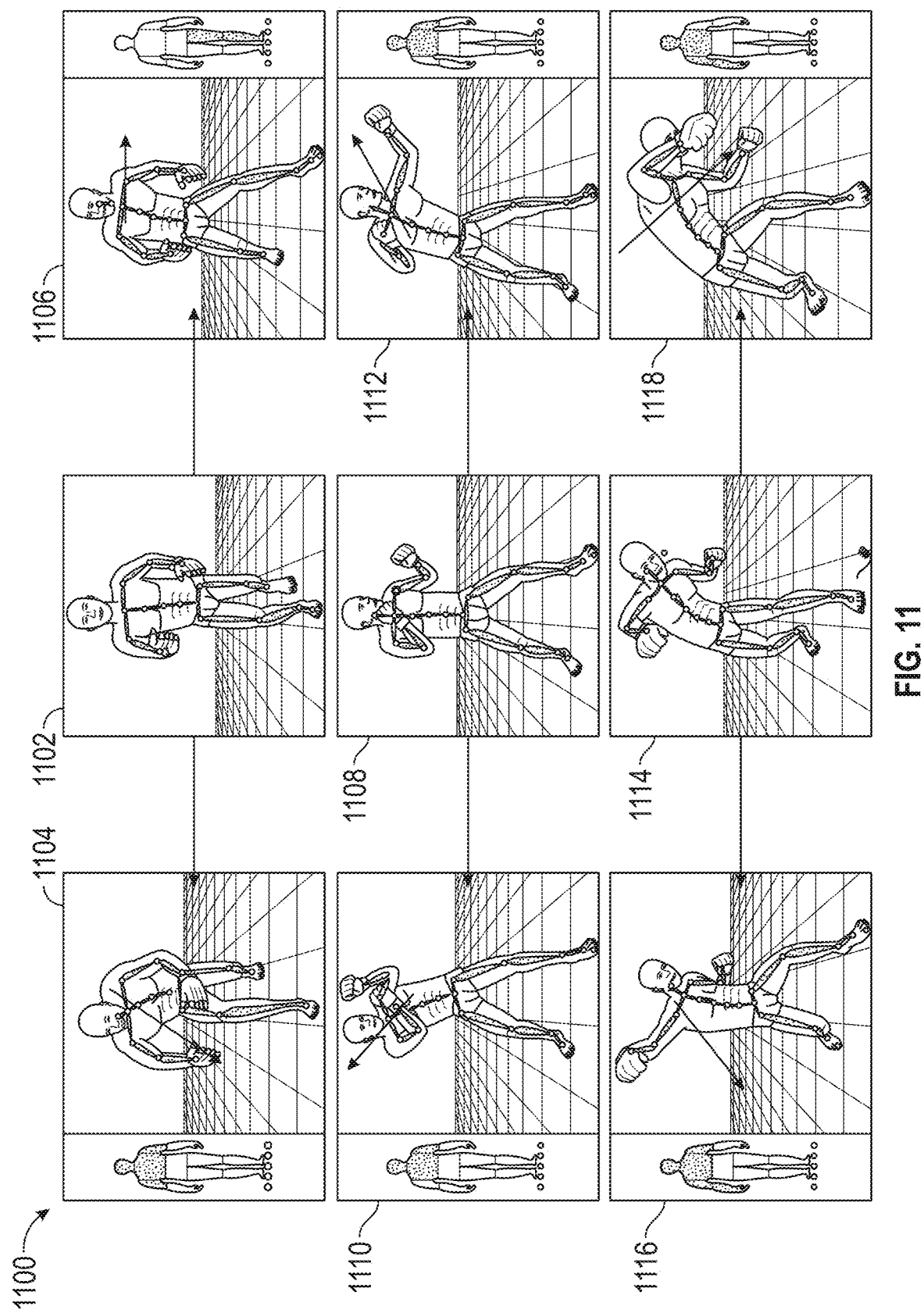
FIG. 11 illustrates a target vector that is interactively controlled by the user and is added to a selected set of joint trajectories (highlighted in magenta) as additional offset to cause a continuous range of motion variations according to some embodiments.

The dynamic animation generation system can generate a variation of movements from a single reference motion and simple user control via additive layering. Modifying a particular motion into similar ones is particularly important for game situations where the user wants to perform a particular action with different conditions, for example doing a specific punch in different direction or speed. FIG. 11 illustrates a target vector that is interactively controlled by the user and is added to a selected set of joint trajectories (highlighted in magenta) as additional offset to cause a continuous range of motion variations according to some embodiments. First, given the generated locomotion curves, the dynamic animation generation system can cause the character to do crouching 1104 or performing a side-step with one leg 1106 from the position 1102. Second, given an idle reference 1108, the dynamic animation generation system can produce a defending 1110 or taunting behavior 1112 by editing the curves into different directions. Lastly, using a punching reference 1114, the action can be edited to target different directions 1116, 1118 while automatically adjusting the full-body pose of the remaining body. Particularly such attacking variations are not included in the original dataset, but only exist in a very sparse manner. This demonstrates that the motion generator not only compresses the animations into a compact network, but also is able to sample between different motion categories by editing a transparent control interface.

Transition Motion Synthesis

Figure 12:
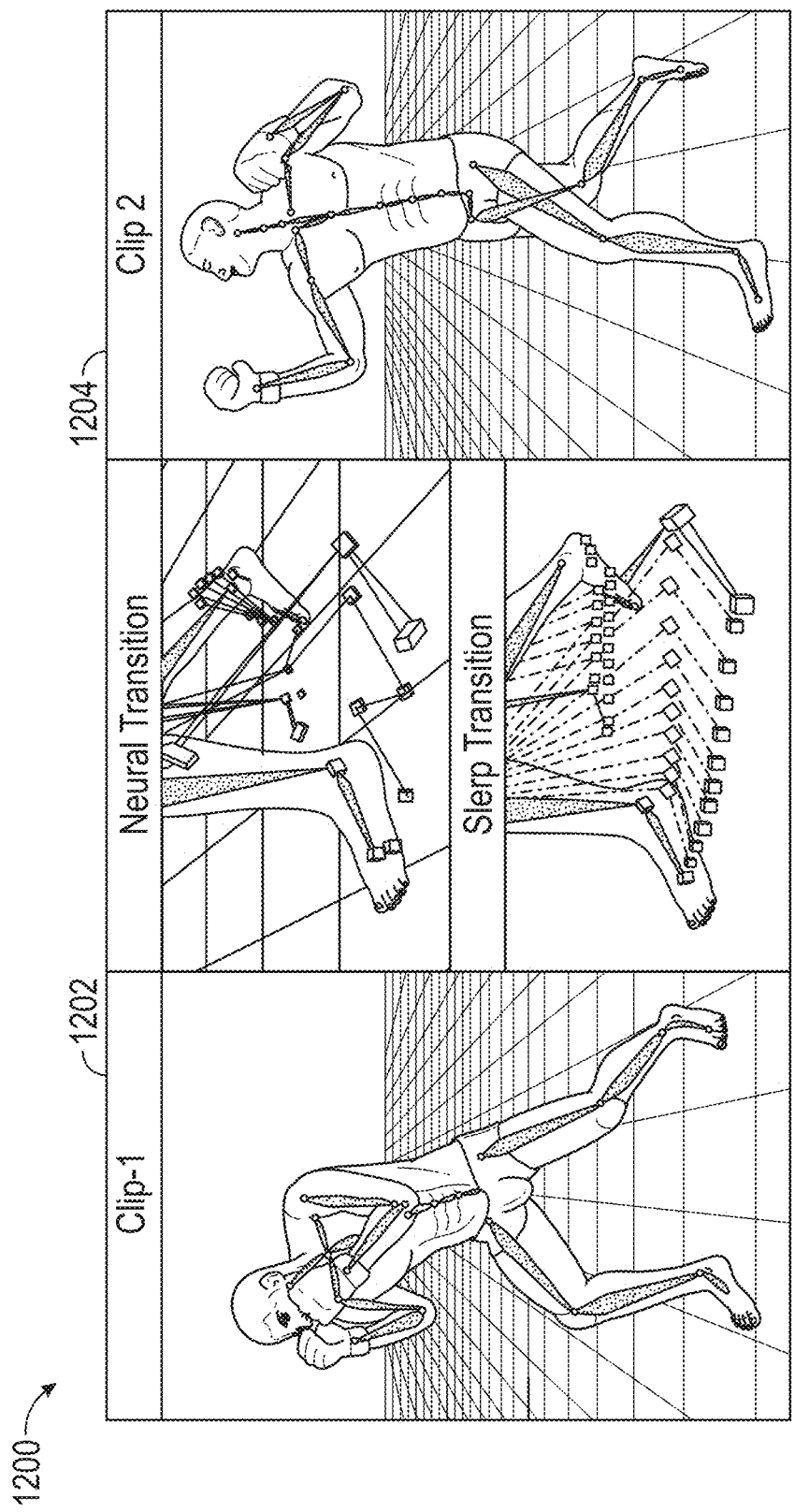
FIG. 12 illustrates an example a pose with the right foot forward is transitioned into an attacking behavior with the left foot forward according to some embodiments.

Synthesizing transition movements between two motion clips can be very challenging when the start and end poses are not aligned with each other. Usually, this requires a lot of tweaking, manual work and experience to avoid artifacts in the motion synthesis, particularly in terms of foot sliding. FIG. 12 illustrates an example a pose with the right foot forward 1202 is transitioned into an attacking behavior with the left foot forward 1204 according to some embodiments. Using spherical linear interpolation, the foot sliding above ground to perform the punch can be observed. Using the framework, the character instead will perform a quick switch of the contacting feet in order to follow the given reference motion. Furthermore, this technique is similarly robust like in the override layering examples when the timing of movements changes, which makes it practical to apply to unstructured datasets and producing realistic transitions between unaligned motion clips.

Signature Movements

Figure 13:
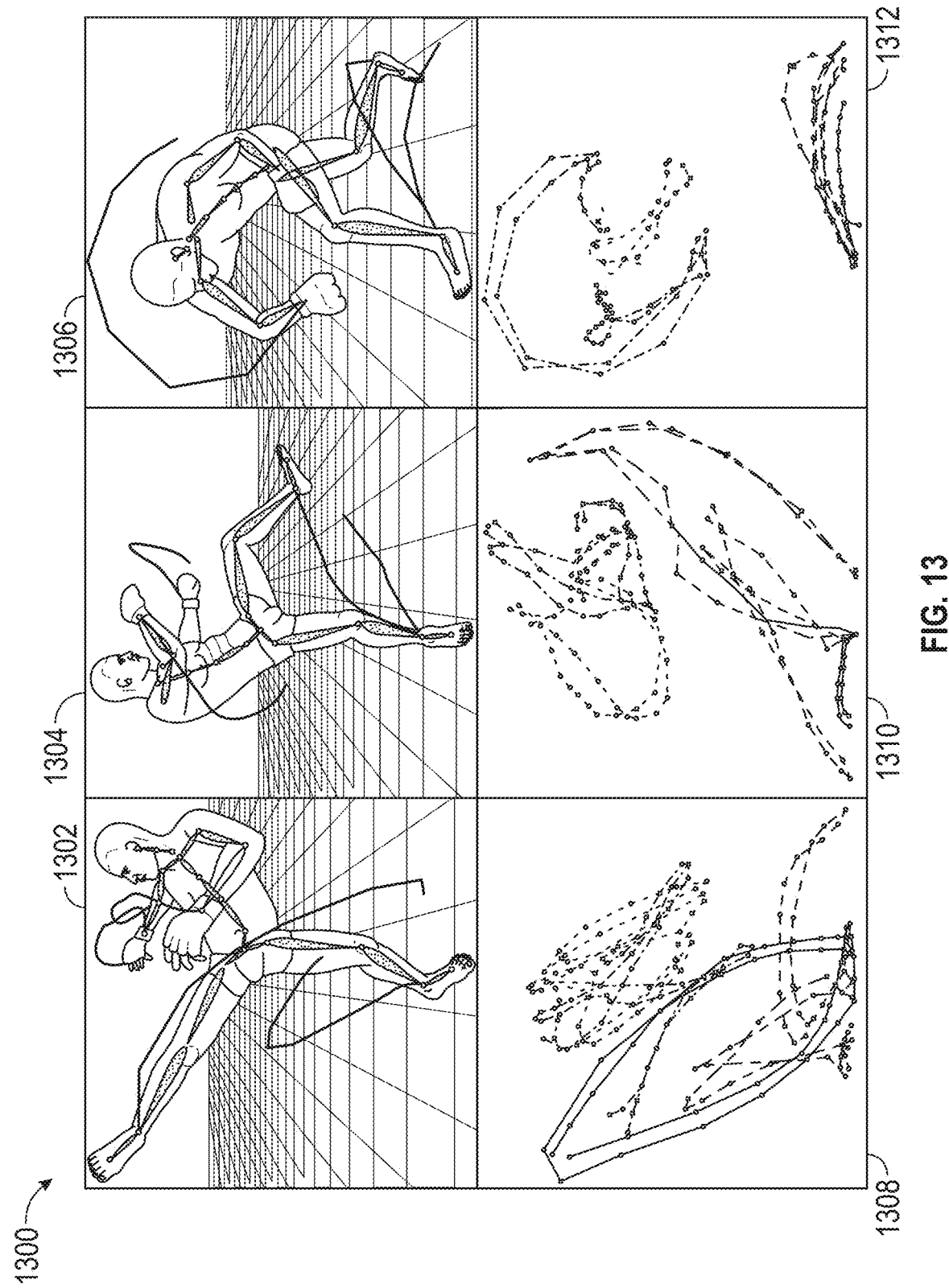
FIG. 13 illustrates the reconstruction of a flying spin kick, crane kick, and overhand strike from given reference curves according to some embodiments.

A common question that rises among animators when using neural networks for motion generation is whether the system is able to synthesize signature movements, such as stylistic attacking behaviors of different fighters in martial arts. First, is the system generally able to encode and reconstruct the detailed motion nuances of such behaviors, and second, how can we then control and synthesize such animations after network training? FIG. 13 illustrates the reconstruction of a flying spin kick 1302, crane kick 1304, and overhand strike 1306 from given reference curves according to some embodiments. Below, the pairs of original and reconstructed end effector trajectories for hands in feet are visualized. Such movements can be difficult to learn since there are not many samples available and the movements often appear very fast. Since the animations are all jointly trained inside the network, the dynamic animation generation system can again apply additive layering to edit the motion after training, and also obtain realistic transitions from unaligned clips.

Character Interactions

Next, synthesizing character interactions in martial arts pose many challenges since the spatial relationships between two characters need to be maintained when interactively controlling the movements. More specifically, a character can be in an unseen state in the game that was not captured inside the data, but a feasible action shall still be performed successfully. FIG. 13 illustrates a kicking action 1302 launched at a starting pose that is not matching the one captured in the data, and therefore would miss the enemy if simply played back according to some embodiments. Using the learned control redirection, a reference motion is correctly modified to successfully hit the opponent 1304 and causing a hit reaction 1306. The hit reaction is synthesized by layering the impacting foot velocity on the root trajectory of a suitable reference movement. The adjusted motion curves 1308, 1310, 1312 are then fed into the motion generator to generate a plausible animation. If the opponent is controlled to instead avoid an incoming attack, FIG. 13 also demonstrates how another control module in form of a neural network can learn from different opponent motions to produce required future trajectories to synthesize a suitable avoidance animation. If the attacker performs a lower kick, a stepping-back movement will be generated 1302, whereas a spinning-punch causes the enemy the lean back 1304 or crouch 1306 depending on the location.

Compression Quality

In this section, the trained motion generator is evaluated as its ability to fit a large variety of different movements from more than 300 GB of unstructured motion capture data. This study indicates how much motion the trained motion generator is able to compress into a shared motion manifold, and that can later be sampled from by given reference movements without requiring retraining. In Table 1 below, the average error in position and rotation when following a given reference motion that has been seen during training is measured. It can be seen that when using the gating structure, the error is consistently lowest across all tested motion categories. In particular the model helps reconstructing the high-frequency components of motion, which achieve segmenting the animations based on the future velocity magnitudes. Without that, both LSTM and MLP architectures tend to produce more blurry results with less accuracy while tracking the targets, especially during fast movements and quick character rotations. Particularly for LSTM, signature movements tend to be modelled rather poorly. This could be due to the latent variables focusing more on the past of the motion, and can not respond well to very agile movements in the given future controls.

|  | Model | | | | | |
| --- | --- | --- | --- | --- | --- | --- |
|  | MOE | | LSTM | | MLP | |
| Deviation | cm | deg | cm | deg | cm | deg |
| Total | 4.8 | 11.1 | 7.9 | 16.5 | 9.1 | 18.4 |
| Locomotion | 5.2 | 8.3 | 5.6 | 9.4 | 8.6 | 13.2 |
| Punch | 3.7 | 11.3 | 5.9 | 14.3 | 7.1 | 16.7 |
| Kick | 4.5 | 11.7 | 8.6 | 16.2 | 9.3 | 18.6 |
| Interaction | 4.1 | 9.4 | 4.5 | 11.6 | 6.9 | 15.8 |
| Signature | 6.1 | 13.6 | 14.7 | 31.1 | 12.6 | 24.4 |
| Misc. | 5.7 | 12.5 | 8.2 | 16.5 | 10.3 | 21.9 |

Overview of Computing Device

Figure 14:
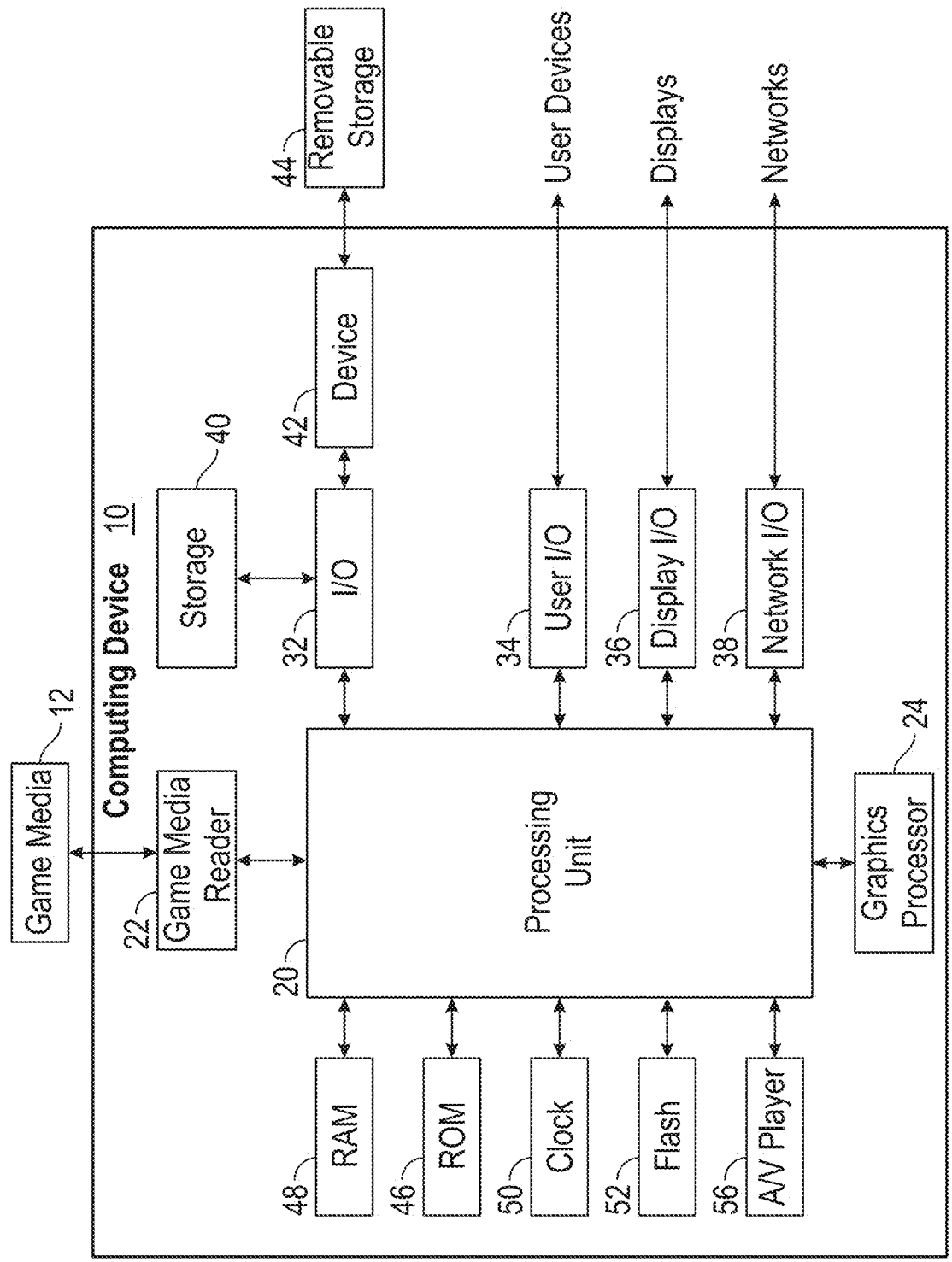
FIG. 14 illustrates an embodiment of computing device that may implement aspects of the present disclosure according to some embodiments.

FIG. 14 illustrates an embodiment of computing device 10 according to some embodiments. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10. The computing device 10 can include one or more components for the interactive computing system 160, and/or a player computing system 152A, 152B. In some embodiments, the interactive computing system 160, and/or a player computing system 152A, 152B can include one or more components of the computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for dynamically generating animation of a virtual character performing certain actions in a virtual environment of an instance of a video game, the method comprising:

receiving a current frame of a virtual character within a virtual environment of an instance of a video game, wherein the current frame includes current pose data for the virtual character;

identifying a plurality of possible behaviors for the virtual character for the next frame based on the current pose data in the current frame, wherein the next frame is a subsequent frame to the current frame;

receiving, from a user of the video game, an input to perform at least a first and second behavior of the plurality of possible behaviors;

determining a plurality of pose data for the first and second behavior;

performing layering of the plurality of pose data corresponding to the first and second behavior on the current pose data to generate layered data;

applying the layered data to a gating network to generate weights; and applying the weights to a pose predictor network configured to generate next pose data for the next frame.

2. The computer-implemented method of claim 1, wherein the gating network receives velocity magnitudes of future joint trajectories for the next pose data, wherein the weights generated by the gating network are blended weights of the future joint trajectories.

3. The computer-implemented method of claim 1, wherein performing layering comprises applying additive layering to the pose data corresponding to the first and second behavior.

4. The computer-implemented method of claim 1, wherein performing layering comprises applying override layering to the pose data corresponding to the first and second behavior.

5. The computer-implemented method of claim 1, wherein performing layering comprises applying blend layering to the pose data corresponding to the first and second behavior.

6. The computer-implemented method of claim 1, wherein the pose predictor network blends weights of a fixed number of structurally identical networks.

7. The computer-implemented method of claim 6, wherein applying the layered data to the gating network comprises applying velocity magnitudes of future joint trajectories for the layered data, wherein generated weights by the gating network comprises blended weights dictating the influence of each of the structurally identical networks.

8. The computer-implemented method of claim 1, wherein the method further comprises applying the current frame with current pose data to the pose predictor network, wherein the pose predictor network is configured to generate next pose data for the next frame based on the current pose data.

9. A system comprising one or more processors and non-transitory computer storage media storing instructions that when executed by the one or more processors, cause the one or more processors to perform operations comprising:

receiving a current frame of a virtual character within a virtual environment of an instance of a video game, wherein the current frame includes current pose data for the virtual character;

identifying a plurality of possible behaviors for the virtual character for the next frame based on the current pose data in the current frame, wherein the next frame is a subsequent frame to the current frame;

receiving, from a user of the video game, an input to perform at least a first and second behavior of the plurality of possible behaviors;

determining a plurality of pose data for the first and second behavior;

performing layering of the plurality of pose data corresponding to the first and second behavior on the current pose data to generate layered data;

applying the layered data to a gating network to generate weights; and applying the weights to a pose predictor network configured to generate next pose data for the next frame.

10. The system of claim 9, wherein the next pose data for the next frame does not match pose data previously stored by the system.

11. The system of claim 9, wherein the gating network applies gating variables according to the following:

$$X_i^\mathcal{M} = \{C_{i+1}, P_i, g_i\}.$$

12. The system of claim 9, wherein the pose predictor network generates the next pose data according to the following:

$$\mathcal{M}(C_{i+1}, P_i) \to P_{i+1}.$$

13. The system of claim 9, wherein the operations further comprise:

mapping trajectories of a number of key joints and a root trajectory of the virtual character in the current frame, wherein the plurality of possible behaviors are identified based on the mapped trajectories and root trajectory.

14. The system of claim 9, wherein the plurality of possible behaviors for the virtual character for the next frame are identified by a neural network configured to determine possible behaviors for the virtual character for the next frame based on the current frame.

15. The system of claim 9, wherein the plurality of possible behaviors for the virtual character for the next frame are identified by a motion matching system for the virtual character in the instance of the video game.

16. A non-transitory computer storage media storing instructions that when executed by a system of one or more processors, cause the one or more processors to perform operations comprising:

receiving a current frame of a virtual character within a virtual environment of an instance of a video game, wherein the current frame includes current pose data for the virtual character;

identifying a plurality of possible behaviors for the virtual character for the next frame based on the current pose data in the current frame, wherein the next frame is a subsequent frame to the current frame;

receiving, from a user of the video game, an input to perform at least a first and second behavior of the plurality of possible behaviors;

determining a plurality of pose data for the first and second behavior;

performing layering of the plurality of pose data corresponding to the first and second behavior on the current pose data to generate layered data;

applying the layered data to a gating network to generate weights; and applying the weights to a pose predictor network configured to generate next pose data for the next frame.

17. The non-transitory computer storage media of claim 16, wherein identifying the plurality of possible behaviors is further based on a distance from an opponent.

18. The non-transitory computer storage media of claim 17, wherein the operations further comprise determining the distance from the opponent based on a root position of the virtual character and a root position for the opponent.

19. The non-transitory computer storage media of claim 17, wherein the operations further comprise determining the distance from the opponent based on a position and velocity information of a body limb for the virtual character and a position and velocity information of a body limb for the opponent.

* * * * *